United States Patent
Itoh et al.

(10) Patent No.: US 6,703,726 B2
(45) Date of Patent: Mar. 9, 2004

(54) PLATEN FOR FLAT LINEAR MOTOR

(75) Inventors: Masato Itoh, Horigane-mura (JP);
Kimihiko Tanaka, Minowa-machi (JP);
Katsuhiko Takeuchi, Matsumoto (JP)

(73) Assignee: Shinano Electronics Co., Ltd., Matsumoto (JP)

( * ) Notice: Subject to any disclaimer, the term of this patent is extended or adjusted under 35 U.S.C. 154(b) by 99 days.

(21) Appl. No.: 10/030,074

(22) PCT Filed: Mar. 27, 2001

(86) PCT No.: PCT/JP01/02519
§ 371 (c)(1),
(2), (4) Date: Jan. 10, 2002

(87) PCT Pub. No.: WO01/86787
PCT Pub. Date: Nov. 15, 2001

(65) Prior Publication Data
US 2002/0105237 A1 Aug. 8, 2002

(30) Foreign Application Priority Data
May 12, 2000 (JP) ........................................ 2000-140584

(51) Int. Cl.$^7$ .............................................. H02K 41/00
(52) U.S. Cl. ....................................................... 310/12
(58) Field of Search ............................... 310/12, 13, 14, 310/254

(56) References Cited

U.S. PATENT DOCUMENTS

| | | | | |
|---|---|---|---|---|
| 4,563,602 A | * | 1/1986 | Nagasaka ..................... | 310/12 |
| 4,661,730 A | * | 4/1987 | Maruyama et al. .......... | 310/12 |
| 5,315,751 A | * | 5/1994 | Hammer ....................... | 29/598 |

FOREIGN PATENT DOCUMENTS

| JP | 50-28414 | 8/1948 |
|---|---|---|
| JP | 50-38413 | 8/1948 |
| JP | 48-9204 | 2/1973 |
| JP | 60-14679 | 1/1985 |
| JP | 63-44685 | 3/1988 |
| JP | 2-299455 | * 12/1990 |
| JP | 7-231588 | * 8/1995 |

OTHER PUBLICATIONS

International Search Report dated Jun. 26, 2001 for International application No. PCT/JP01/02519 (in Japanese and with English Translation).

* cited by examiner

Primary Examiner—Thomas M. Dougherty
Assistant Examiner—Nguyen N Hanh
(74) Attorney, Agent, or Firm—Armstrong, Kratz, Quintos, Hanson & Brooks, LLP

(57) ABSTRACT

A platen used as a stator of a planar linear motor having a platen body (90) comprised of a stacked member (91) of magnetic sheets (T) giving a high performance and a backing plate. The backing plate of the stacked member (91) is formed with dovetail grooves (91a) along a direction perpendicular to the sheet edge direction. The backing plate (92) has a plurality of first through holes (92a) discretely arranged in lines longitudinally across the strip-shaped portions facing the dovetail grooves (91a). Top bent side ends (94) of connecting beam members (93) have pluralities of second through holes (94a) discretely arranged in lines longitudinally across the beam longitudinal direction. Joints (100) of a fluid hardening material injected into the dovetail grooves (91a) and the through holes (94a) (92a) to fill and harden in the same are formed. The joints (100) are comprised of molded connecting parts (101) filling and fastening the dovetail grooves (91a) and molded joining parts (102) connected to the same, filling the through holes (94a) and (92a), and holding together the backing plate (92) and the top bend side ends (94).

26 Claims, 32 Drawing Sheets

DIRECTION OF MAGNETIC FLUX

DIRECTION OF ADVANCE

PLATEN FOR FLAT LINEAR MOTOR

TECHNICAL FIELD

The present invention relates to a platen used as a stator of a planar linear motor, more particularly relates to a platen comprised of a plurality of magnetic sheets.

BACKGROUND ART

First, explaining the principle of a Sawyer linear motor, as shown in FIG. 30, it is comprised of a platen (stator) 10 comprised of a magnetic thick plate on whose surface is repeatedly formed platen dots D at a spatial period of the dot pitch P and a movable member (traveling member) 20 comprised of a permanent magnet M for generating a bias magnetic flux, first and second yokes Y1 (Y2) bonded to the magnetic pole surface to be arranged in parallel to the direction of advance and provided with first and second branched magnetic path legs A and A' (B and B'), series-connected first and second A-phase excitation coils CA and CA' wound around the first and second branched magnetic path legs A and A' of the first yoke Y1, series-connected first and second B-phase excitation coils CB and CB' wound around the first and second branched magnetic path legs B and B' of the second yoke Y2, and two pole teeth (projecting poles) KA and KA' (KB and KB') formed at each of the bottom ends of the first and second branched magnetic path legs A and A' (B and B') and arranged in the direction of advance at intervals of ½ of the dot pitch P. Here, each branched magnetic path leg may be formed with only one pole tooth, but in the event of several, the spatial phase held with respect to the closest dots of the platen dots D is the same. Further, the interval between the first branched magnetic path leg A (B) and second branched magnetic path leg A' (B') is set so that the spatial phases with respect to the closest dots are shifted in the direction of advance by exactly P/2. Further, the interval between the second branched magnetic path leg A' and the first branched magnetic path leg B is set so that the spatial phases with respect to the closest dots are shifted in the direction of advance by exactly P/4.

The movable member 20 has a pressurized air ejection port and floats slightly above the surface of the platen 10 by blown pressurized air. As shown in FIG. 30A, if a B-phase current of the illustrated polarity is flown through only the terminals of the first and second B-phase excitation coils CB and CB' of the second yoke Y2, not only the bias magnetic flux due to the permanent magnet M, but also the alternating magnetic flux due to the second excitation coil CB' are superposed and strengthened to generate a concentrated magnetic flux portion α in the air gap between the pole teeth KB' of the second branched magnetic path leg B' and the closest dots D1 and D2 and strongly magnetically draw the pole teeth KB' to the closest dots D1 and D2. Also, an alternating magnetic flux is applied to the pole teeth CB of the first branched magnetic path leg B in a direction canceling out the bias magnetic flux, so an extinguished magnetic flux portion β is formed. On the other hand, the magnetic flux comprised of the concentrated magnetic flux from the second branched magnetic path leg B' of the second yoke Y2 branched via the inside of the platen 10 passes through the first and second branched magnetic path legs A and A' of the first yoke Y1, but the pole teeth KA of the first branched magnetic path leg A are delayed in the direction of advance by exactly P/4 with respect to the closest dots D15 and D14. Therefore, the closest dots D15 and D14 pull the pole teeth KA in the direction of advance by one branched magnetic flux and the pole teeth KA' of the second branched magnetic path leg A' proceed in the direction of advance by exactly P/4 with respect to the closest dots D10 and D9 due to the other branched magnetic flux. Accordingly, the closest dots D10 and D9 pull the pole teeth KA' in a direction opposite to the direction of advance. Therefore, the thrust in the direction of advance and the pullback force in the reverse direction match each other perfectly and the first yoke Y1 as a whole is balanced. That is, a thrust branched magnetic flux portion δ is generated in the air gap between the pole teeth KA of the first branched magnetic path leg A and the closest dots D15 and D14, while a pullback force branched magnetic flux portion γ is generated in the air gap between the pole teeth KB of the second branched magnetic path leg B and the closest dots D10 and D9, so the first yoke Y1 itself becomes a stable point of the magnetic attraction potential.

Next, as shown in FIG. 30B, if an A-phase current of the illustrated polarity is supplied to only the terminals of the first and second A-phase excitation coils CA and CA' of the first yoke Y1, the air gap between the pole teeth KA of the first branched magnetic path leg A and the closest dots D15 and D14 switches from what had been the thrust branched magnetic flux portion δ immediately before to the concentrated magnetic flux portion α comprised of the bias magnetic flux plus the alternating magnetic flux from the second excitation coil 4 superposed, while the pole teeth KA' of the second branched magnetic path leg A' switch from the pullback branched magnetic flux portion γ to the extinguished magnetic flux portion β, so the closest dots D15 and D14 strongly magnetically draw the pole teeth KA and advancing thrust occurs at the movable member 20. On the other hand, a branched magnetic flux to form the concentrated magnetic flux at the first branched magnetic path leg A of the first yoke Y1 through the inside of the platen 10 passes through the first and second branched magnetic path legs B and B' of the second yoke Y2. The pole teeth KB of the first branched magnetic path leg B switch from the extinguished magnetic flux portion β to the thrust branched magnetic flux portion δ, while the pole teeth KB' of the second branched magnetic path leg B' switch from the concentrated magnetic flux portion α to the pullback branched magnetic flux portion γ. Therefore, due to the switching of the two-phase current, the movable member 20 advances by exactly P/4. If including the excitation patterns of FIGS. 30C and 30D, with a two-phase current, there are four excitation patterns of the excitation coils, so by one round of the excitation patterns, the movable member 20 advances four times and proceeds by exactly one pitch worth of distance. In the process of the switching of the two-phase current, a thrust force is generated at the pole teeth moving from the thrust branched magnetic flux portion δ to the concentrated magnetic flux portion α.

To realize a planar linear motor having a movable member which moves planarly (two-dimensionally) in the Y-axial and Y-axial directions using such a Sawyer linear motor, for example, as seen in Japanese Unexamined Patent Publication (Kokai) No. 9-261944, as shown in FIG. 31 and FIG. 32, there are provided a platen 10 formed on the platen surface with substantially square-top platen dots D arranged in a matrix and a composite movable member comprised of X-axis movable members 20 having stripe-shaped projecting pole teeth KA and KA' (KB and KB') parallel to the Y-axis and providing drive in the X-axial direction and Y-axis movable members 20Y having stripe-shaped projecting pole teeth KA and KA' (KB and KB') parallel to the X-axis and providing drive in the Y-axial direction—all connected by a support plate 30 in an in-planar perpendicular relationship.

On the other hand, the platen serving as the stator essential for the planar linear motor uses a pure iron plate formed by a single block material as the platen body and has a backing reinforcing plate of a thick steel plate bonded to the back surface by welding. The surface of the platen body is formed with platen dots arranged in a matrix by cutting. A resin etc. is filled in the lattice-like grooves between the dots, then the surface is flattened by precision polishing. The backing reinforcing plate is required for preventing warping of the platen surface and ensuring flatness when precision polishing the platen surface. If a pure iron platen body is used, however, an eddy current naturally occurs due to the magnetic flux passing through the inside of the platen body of this uniform continuous plate, so the AC magnetizing characteristic is poor and the power loss (iron loss) large and therefore it is difficult to obtain a high speed, high thrust force movable member and a large current capacity is required. The higher the frequency the driving periodic current (current pulse) is made and the higher the speed of the advance, the more rapidly the thrust force falls and the worse the efficiency (speed×thrust force/power consumption) becomes.

Therefore, the present inventors got the idea of suppressing the occurrence of the eddy force at the platen body and realizing a high speed, high thrust, and high efficiency planar linear motor by using a stacked member comprised of a plurality of magnetic sheets (for example, a thickness of not more than 1 mm), and using the parallel sheet edge surface side of the stacked member as the platen surface. If using a stacked member of sheets as the platen body, since an eddy current does not easily pass through the stacked interfaces (joined surfaces) of the magnetic sheets, the occurrence of an eddy current can be suppressed, so it is possible to realize a high speed, high thrust, high efficiency planar linear motor.

Here, the magnet flux in the stacked member is refracted or blocked at the joined surfaces and conversely the magnetic resistance is high, so it was thought that it was not actually possible to form a magnetic circuit for an advancing magnetic flux along the normal direction of the joined surfaces and that advance of the monoaxial movable member in the direction perpendicular to the sheet edge direction was impossible. The present applicant, however, as disclosed in Japanese Patent Application No. 2000-56721, found that in the case of an n-phase drive current and a movable member having an electrode tooth pattern comprised of 2n number of electrode teeth, if the electrode teeth are arranged laterally in a line in an equivalent spatial phase relationship with respect to the closest dots arranged in the sheet edge direction of the magnetic sheets, the 2n number of electrode teeth are arranged at staggered positions within one dot pitch (P) in the normal direction of the joined surfaces of the magnetic sheets, and the spatial phase with respect to the closest dots arranged in the normal direction differ by increments of exactly the difference in spatial phase (P/2n), the movable member having such an electrode tooth pattern moves by a crawling advancing motion in the direction perpendicular to the sheet edge direction.

When using a stacked member comprised of a large number of magnetic sheets stacked together as the platen body, aside from the advantages in performance of the linear motor, it is possible to obtain advantages in manufacturing such as the ability to form the platen dots on the magnetic sheets not by a cutting step, but by etching or a punch press. Since not the stacked surface, but the parallel sheet edge surface of the stacked member (sheet edge lateral cross-section) is used as the platen surface, however, to obtain a platen surface of a size of 1 m×1 m using strip-shaped magnetic sheets of a thickness of 1 mm, over 1000 sheets become necessary. The stacked thickness becomes more than 10 times greater than the width of the strip-shaped magnetic sheets (corresponding to thickness of platen body) in this stacked structure. In view of this, it is necessary to give full consideration to maintaining the shape of the stacked member itself and to prevent deformation.

Therefore, in view of these problems, a first object of the present invention is to provide for practical use a platen for a planar linear motor using a stacked member of magnetic sheets by realizing a binding structure of the magnetic sheets. A second object of the present invention is to provide for practical use a platen for a planar linear motor using a stacked member of magnetic sheets by realizing a structure restricting torsional deformation of the stacked member. A third object of the present invention is to provide for practical use a platen for a planar linear motor using a stacked member of magnetic sheets by realizing reduced weight of the stacked member.

DISCLOSURE OF INVENTION

A platen for a planar linear motor according to the present invention is provided with a platen body using a stacked member comprised of a large number of magnetic sheets aligned and stacked together and having a large number of platen dots formed in a two-dimensional array at one parallel sheet edge surface side (platen surface) of the stacked member. It has a connecting beam member supporting said stacked member at regular discrete positions in the sheet edge direction at the other parallel sheet edge surface side of the stacked member and a binding means for binding the magnetic sheets between the other parallel sheet edge surface side and the connecting beam members.

According to this configuration, since the stacked member is bound in a perpendicular direction to the sheet edge direction at the other parallel sheet edge surface by connecting beam members serving as the binding means, breakdown or deformation of the stacked member can be suppressed. Further, since one parallel sheet edge surface side of the stacked member is free, the flatness as a platen surface can be secured. Further, the binding means do not occupy the entire area of the other parallel sheet edge surface. The areas between the connecting beam members are non-bound areas. Therefore, it is possible to suppress to a maximum the working deformation or strain etc. of the magnetic sheets accompanying the binding step from reaching the platen surface side. By reducing the thickness of the stacked member (width of magnetic sheets), it is possible to achieve a lower cost and lighter weight of the platen. Of course, the connecting beam members themselves function as support members of the stacked member, so it is possible to ensure the retention of the shape of the stacked member even at the time of actual use such as at the time of movement when carrying or suspending the movable member.

In general, there is a tradeoff between the working deformation etc. of magnetic sheets accompanying the binding step reaching the platen surface and the reduction of thickness of the stacked member. Considering the former problem, the proximate cause is the initial stress occurring due to the mechanical working of the magnetic sheets themselves forming the stacked member in the binding step. Therefore, to realize reduced weight of the platen by reducing the width of the magnetic sheets, it is necessary to employ binding means resistant to initial stress at the other parallel sheet edge surface side of the stacked member. For example, when employing binding means using holes passing through the stacked member in the stacking direction as binding holes and press-fitting through rods through the same, the compression stress extends from around the binding holes at the time of press-fitting the through rods. Further, to provide the binding holes, it is necessary to increase the width of the magnetic sheets by the amount of the binding margin. Therefore, use of binding means accompanied with stress is not suitable for reducing the thickness of a stacked member.

The present inventors engaged in intensive research into a binding means resistant to the occurrence of working stress and as a result took note of a binding means using injection of a fluid hardening (solidifying) material. Joints made using brazing or welding can also in a certain sense be called binding means using a fluid hardening material (filler material), but at the time of brazing or welding, joining is difficult without preheating the areas scheduled for joining of the base material (stacked member) to a high temperature, so heat affected areas and deformation under contraction due to rapid cooling occur in the base material, that is, the magnetic sheets, the insulating film of the magnetic sheets deteriorate under the heat, and residual stress or warping or other deformation arise.

Therefore, as the binding means, male parts or female parts are formed along a perpendicular direction of the other parallel sheet edge surface of the stacked member and use is made of joints of a fluid hardening material having molded connecting parts fastening with the same and molded joining parts connecting with the molded connecting parts and gripping parts of the connecting beam members. The binding means according to the present invention simultaneously provide a binding function of binding together the large number of magnetic sheets of the stacked member and a connecting function of connecting the stacked member and connecting beams serving as support members. The molded connecting parts fastening with the male parts or the female parts of the stacked member by filling and hardening provide the binding function, while the molded joining parts gripping parts of the connecting beam members provide the connecting function. The male parts or the female parts are formed at the stacked member in a step before injecting the fluid hardening material so as to secure areas of an anchor action or filled with the fluid hardening material and thereby attain the binding function. Further the gripping joining structure is used so as to attain a locking type fastening action. This is particularly beneficial when supporting the platen hanging down. As the male part, a stacked ridge comprised of projections provided at the magnetic sheets may be used. The projections may be formed with through holes. It is possible to form the edges of the projections serrated in order to improve the filling power. Further, the female part may be a groove formed by stacking notches provided in the magnetic sheets. Male parts and female parts may be used together as well. Further, binding holes or cut slits may also be used. Since the binding means are made of a fluid hardening material, before the step of injecting the fluid hardening material, it is sufficient to form through holes etc. for forming molded joining parts in addition to the male parts or female parts at the connecting beam members and other support side as shaping parts of the mold. Further, since it is possible to form a plurality of molded joining parts at one time simultaneously with the molded connecting parts by injecting the fluid hardening material, a reduction in cost can be expected through a reduction in the number of manufacturing steps. The plurality of molded connecting parts can be compared with the branching stems from fibrous underground plants, but since the attachment force of the male parts or female parts and the molded connecting parts is secured by the attachment area, even when the platen is supported hanging down, since the supporting force is dispersed among the plurality of molded joining parts, there is resistance to separation of the male parts or female parts and the molded joining parts and both a binding function and connecting function can be achieved.

Here, the selection of the fluid hardening material is important. Even an adhesive can provide a considerable attachment force, but even if the bond strength is large, if the strength of the solidified adhesive is weak, that solidified portion will easily break, so use of a molten resin material or a molten metal material is preferable. When using a molten metal material, even if the melt temperature is high, when the molten metal material is injected, it is rapidly cooled and hardened, so the problem of thermal strain is not that serious. However, it is preferable to inject the melt while cooling the stacked member. It is also possible to cool just the platen surface side. Further, it is possible to use a filler material melting at a comparatively low temperature. Preferably, an aluminum alloy having a melting point of 200 to 400EC (brand name Alumite) or solder is suitable. In the case of a low temperature solder, the casting becomes incomplete at heat sinks of the stacked member and there is a danger of formation of islands. In the case of a molten metal material, the mechanical strength of the molded parts rises, but fusion bonding with the male parts or female parts is difficult due to compatibility with the base material and the bond strength may not be able to be secured.

Therefore, to supplement the bond strength, it is possible to improve the anchor effect by making joint use of mechanical locking mating parts. That is, in the case of a male part, by using a projecting ridge and making its lateral cross-section for example broad in the front end and narrow in the base, the molded connecting part is naturally formed as a female part, so locking mating parts are formed and the anchor effect can be raised. Further, in the case of a female part, by using a groove and making its lateral cross-section for example narrow in opening and broad in interior, the molded connecting part is naturally formed as a male part, so locking mating parts are formed and the anchor effect can be raised. Use of even molten metal materials with a poor compatibility in fusion bonding becomes possible and the freedom of selection of the molten metal material is increased. Rather, a poor compatibility in fusion bonding means greater resistance to formation of heat affected areas in the magnetic sheets (silicon steel sheets etc.) and deformation under contraction can be suppressed.

In this way, by employing an injection type joint of a fluid hardening material, it is possible to simultaneously achieve a binding function and a connecting function. This is however not limited to just the stacked member and the connecting beam members. It is also possible to interpose various auxiliary members between the stacked member and the connecting beam members. The stacked member is supported by the connecting beams, but when configuring the platen by just these, if an outside force or inertial force acts laterally on the stacked member during transport of the platen etc., torsion will occur in the magnetic sheets, the sheet edges will bend due to the torsion, the advancing magnetic fields between staggered electrode teeth of the movable member will become asynchronous, and advance may become impossible. In particular, torsion becomes more serious the smaller the thickness or width of the magnetic sheets.

Therefore, it is preferable to provide an outside frame abutting against at least the two side surfaces of the stacked member in the stacking direction and clamping the stacked member. To suppress deformation of the outside frame itself, it is effective to place a backing plate (sheet) against the other parallel sheet edge surface of the stacked member. The backing plate functions as a spacer for defining the distance between facing side plates of the outside frame. Further, the backing plate provides support at the areas not facing the connecting beams in the other parallel sheet edge surface, so can directly prevent deformation of the stacked member. In addition, since the other parallel sheet edge surface is placed against the flat surface of the backing plate, if the width dimensions of the magnetic sheets are controlled to a high precision, the flatness of the platen surface can be secured, use of strip-shaped magnetic sheets having platen dot projections becomes possible, and the step of forming the platen dots on the stacked member after stacking can be eliminated. Note that the platen body and the outside frame may suitably form a box structure.

On the other hand, as a structure enabling prevention of deformation of the stacked member without using a backing plate, there is a stacked member having bonding layers interposed between the adjoining magnetic sheets. Of course, use of a backing plate as well is also possible. As the bonding layers, coated layers of an epoxy resin or other adhesive are suitable. It is possible to repeatedly stack magnetic sheets while interposing the bonding layers so as to obtain the stacked member. There is no problem even with some unevenness of coating. To control the thickness of the bonding layers, for example, after coating the adhesive on a magnetic sheet surface, cut pieces of the magnetic sheets or other spacer materials may be scattered on it, then the next magnetic sheet pressed down to push out the excessive adhesive in the gap. It is also possible to scatter cut pieces of the magnetic sheets or other spacer materials on a magnetic sheet formed with through holes or notches, overlay the next magnetic sheet, then, after preparing a stacked member of the necessary number of sheets, immersing it in an adhesive to fill the gaps between the sheets by the adhesive through the through holes or notches and thereby form the bonding layers all at once. The through holes are simultaneously filled, so it is possible to prevent deformation of the stacked member and secure the required strength. Further, the through holes or notches perform the function of concentrating the advancing magnetic paths at the parts of current resistance suppressing eddy current or the platen surface side. This contributes to the higher performance of the linear motor.

Note that when employing an injection type joint of a molten metal material for a stacked member having bonding layers of an adhesive interposed in it, the molten metal material hardens instantaneously. There is of course no problem with deterioration of the adhesive. Rather, quick drying and curing of the adhesive can be expected due to the surplus heat and the drying and aging step can be simplified.

The platen dots may be formed on the parallel sheet edge surface of the stacked member by shape-cutting electrodischarge machining or may be formed by etching. Here, in the case of a stacked member without bonding layers, the working fluid is liable to penetrate deep into the clearances between the sheets. In the case of a stacked member with bonding layers, when the degree of adhesion is high, the bonding layers function as masks against the working fluid, so deep penetration of the working fluid can be prevented.

Now, explaining the specific binding means below, when using a backing plate, the platen body is comprised of the stacked member and a backing plate placed against the parallel sheet edge surface of the same, a plurality of first through holes discretely arranged in lines longitudinally are formed across the strip-shaped portions facing the grooves serving as female parts of the backing plate, each connecting beam member is provided with a bent side end to be placed against the backing plate, a plurality of second through holes discretely arranged in lines longitudinally are formed in the beam longitudinal direction of the bent side ends, the molded connecting parts are made male molded parts formed by filling the grooves, and the molded joining parts are made rivet-shaped molded parts formed by filling the first and second through holes. It is possible to use a fluid hardening material such as an aluminum alloy to achieve an anchor effect. The grooves may be dovetail grooves or may be partially circular in lateral cross-section. Lateral cross-section inverted T-shaped notches, lateral cross-section inverted L-shaped notches, lateral cross-section F-shaped notches, lateral cross-section S-shaped notches, and other notches forming grooves in lateral cross-section may be formed in the magnetic sheets by punching before stacking, so the female mating parts can be naturally formed. The invention is not limited to the case of formation of openings or slits etc. of female parts in the other parallel sheet edge surface in the above way. It is also possible to provide through holes in the stacking direction for serving as runners at positions close to the other parallel sheet edge surface and form openings or slits exposed at the other parallel sheet edge surface discretely connected to these through holes.

When not using a backing plate, the binding means may also be a welded joint formed by laser beam welding the abutting surfaces of the side surface of a connecting beam member and the parallel sheet edge surface along the same. The welding is not arc welding or gas welding etc., but is instantaneous welding restricting the welding zone, so thermal strain etc. of the stacked member can be prevented. However, it is better to perform the laser beam welding while cooling the platen surface side. Since a temperature gradient is formed, it is possible to prevent the thermal strain from reaching the platen surface.

Here, when the side end of a connecting beam member is the plate edge, if the side end surface is placed against the parallel sheet edge surface, the welded joint becomes a T-shaped joint, so the range of support of the stacked member is limited to the thickness dimension of the plate. Further, when securing a balance of strength in connection by welding at both the front and back sides of the plate, the fillet welds become close to each other across the distance of the plate thickness, so the thermal strain becomes superposed and becomes larger at the abutting portions. Therefore, it is preferable to use a connecting beam member having an inverted L-shaped bend side end and place the outside surface of that bent side end against the parallel sheet edge surface. The support becomes broader in range and stabler and the fillet welds are separated by the width of the bent side end, so it is possible to prevent superposition of thermal strain etc.

When the compatibility of the stacked member and the connecting beams in laser beam welding is poor, spacers with good compatibility are used. That is, each connecting beam member is comprised of a beam body having a bent side end and a long spacer placed against and fastened with the outside surface of that bent side end. The binding means is made a welded joint formed by laser beam welding the abutting parts of the long spacer and the other parallel sheet edge surface along the same.

In the case of the injection type joint of the fluid hardening material explained above, the functions are split among the molded connecting part and molded joining part, but it is also possible for substantially the same portion to provide both functions. For example, the stacked member has grooves formed along a perpendicular direction in the other parallel sheet edge surface, each connecting beam member is provided with a beam body having a bent side end and a long male part provided by fastening or integrally with the outside of the bent side end, and the binding means is made a fluid hardening material formed by filling the clearances when loosely fitting together the long male part and the groove. When the fluid hardening material is a fusion bonding molten metal, the molded connecting part formed along the clearances exhibits the binding function and provides the connecting function by fusion bonding with the long male part. With a nonfusion bonding fluid hardening material, however, while a binding function can be obtained, a connecting function cannot be obtained. By making the lateral cross-section of the groove for example narrow in opening and broad in interior and making the lateral cross-section of the long male part for example broad in front end and narrow in base, a locking action is exhibited, so a connecting function is obtained. In this case, of course the end of the long male part is inserted into the end opening of the groove. Conversely, actions and effects similar to the above are exhibited even by a structure providing for example a long male part of a cross-section broad in the front end and narrow in the base at the stacked member, forming for example a groove of a cross-section narrow in opening and broad in interior at the beam body side, loosely fitting together the long male part and the groove, and filling the fluid hardening material in the clearances. A structure providing a long male part or groove at the beam body side in this way, however, requires the fastening of separate members or cutting work, which leads to higher manufacturing costs.

Therefore, to form a simple binding means not using a backing plate, it is preferable that the female part of the stacked member be a groove, the connecting beam member have a bent side end, the bent side end have a plurality of through holes discretely arranged longitudinally in a line in the beam longitudinal direction, the molded connecting part be a male molded part formed by filling the groove, and the molded joining part be a rivet-shaped molded part formed by filling the through holes. It is even better if the groove is narrow in opening and broad in interior in lateral cross-section. The fastening force of the rivet-shaped molded part is strong and the locking action is high, so loosening will not easily occur even if vibration occurs in the platen during operation.

Conversely, the stacked member may be formed with a projecting ridge as a male part, each connecting beam member may have a groove having a plurality of through holes discretely arranged in a line longitudinally along the beam longitudinal direction in the groove bottom, the molded connecting part may be a female molded part formed by filling the remaining clearance in the groove when the groove accommodates the projecting ridge, and the molded joining part may be a rivet-shaped molded part formed by filling the through holes. It is even better if the projecting ridge is made broad in front end and narrow in base in lateral cross-section.

Further, it is possible to employ a configuration in which the female part is narrow in opening and broad in interior in lateral cross-section, each connecting beam member has a plurality of notches formed discretely along the beam longitudinal direction of its side end surface, the molded connecting part is a male molded part formed by filling the remaining clearance when the side end surface is made to abut against the bottom surface of the groove, and the molded joining part is a rivet-shaped molded part formed by the overflow of the material from the opening of the groove. The locking of the stacked member and molded connecting part need not be continuous and may be just discrete as well.

Further, it is possible to employ a configuration in which the female part of the stacked member is a first groove narrow in opening and broad in interior in lateral cross-section, each connecting beam member has a bent side end, the bent side end has a second groove formed at its outside surface along the beam longitudinal direction and narrow in opening and broad in interior in lateral cross-section, and each binding means is a pegged dual bulging end molded part formed by filling the first and second grooves in a mated state. The first groove of the stacked member and one bulging portion of the pegged dual bulging end molded part provide the binding function and a locking function, while the other bulging portion of the pegged dual bulging end molded part and the connecting beam members provide a locking and connecting function. This corresponds to a so-called molded rivet.

BEST MODE FOR CARRYING OUT THE INVENTION

First, before explaining the platen for a planar linear motor according to the present invention, the general configuration of a planar linear motor will be explained.

Figure 1:
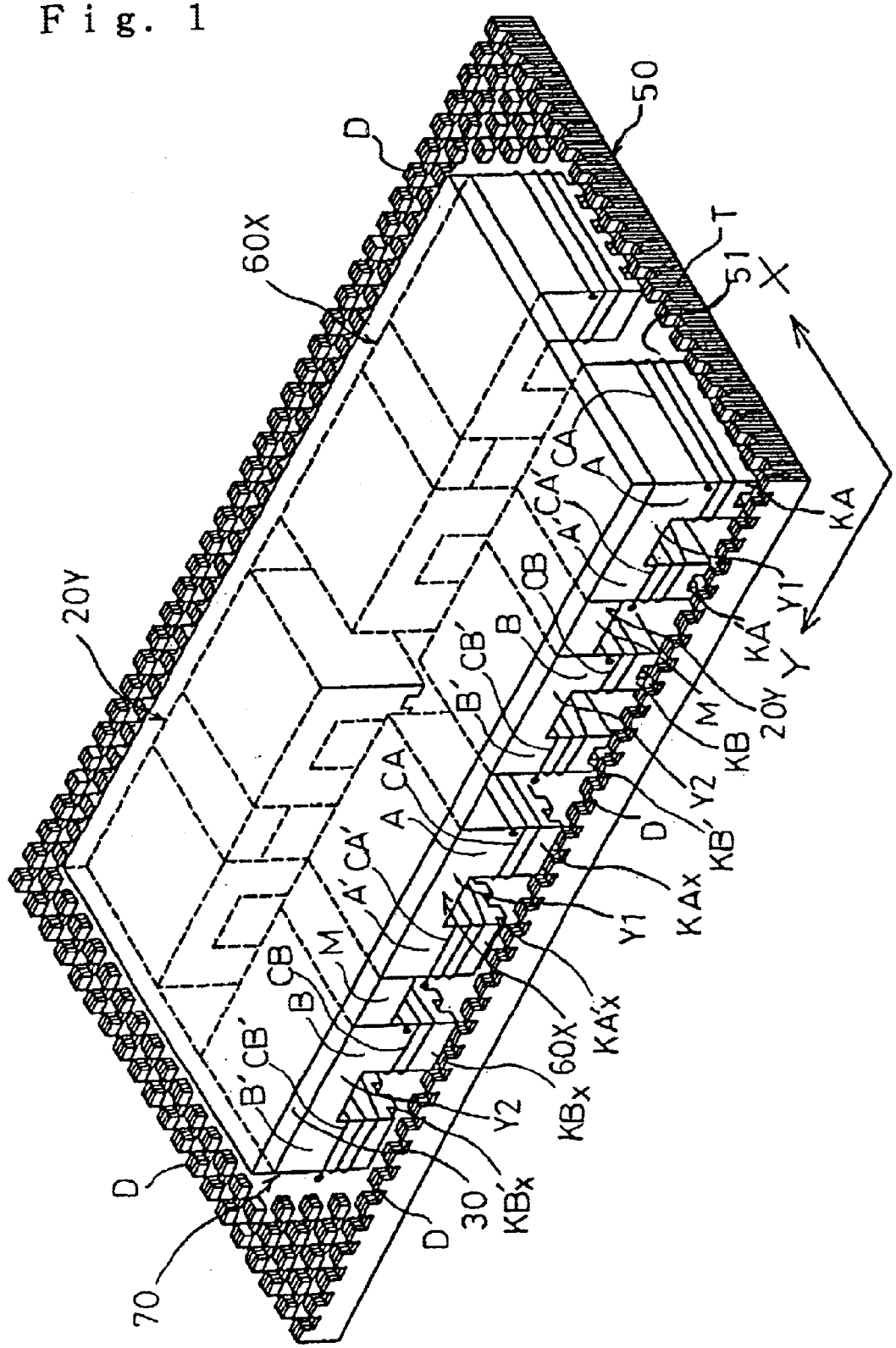
FIG. 1 is a perspective view of the general configuration of a two-phase planar linear motor according to the present invention.
Figure 2:
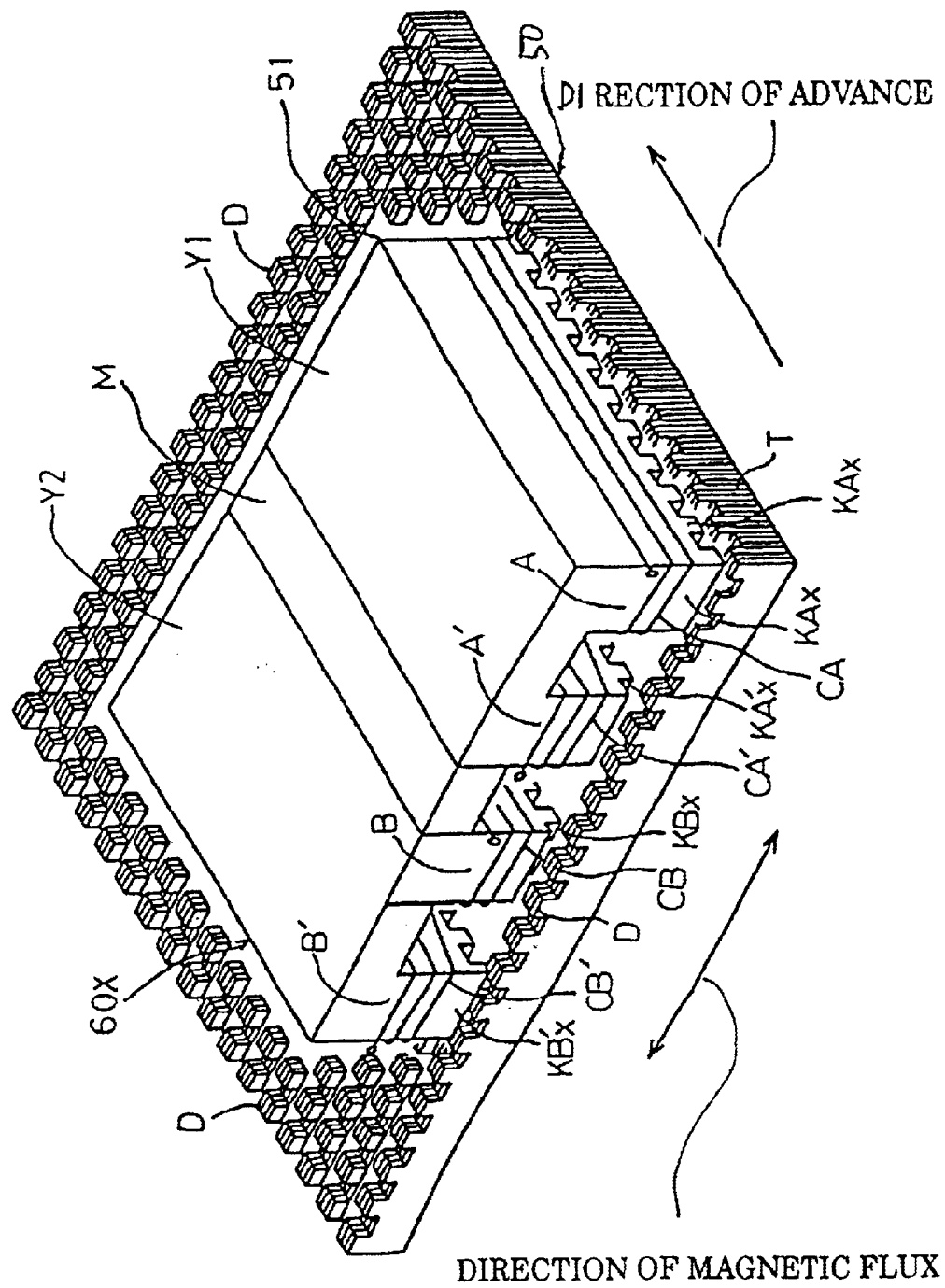
FIG. 2 is a perspective view of an X-axis movable member in the motor.
Figure 3:
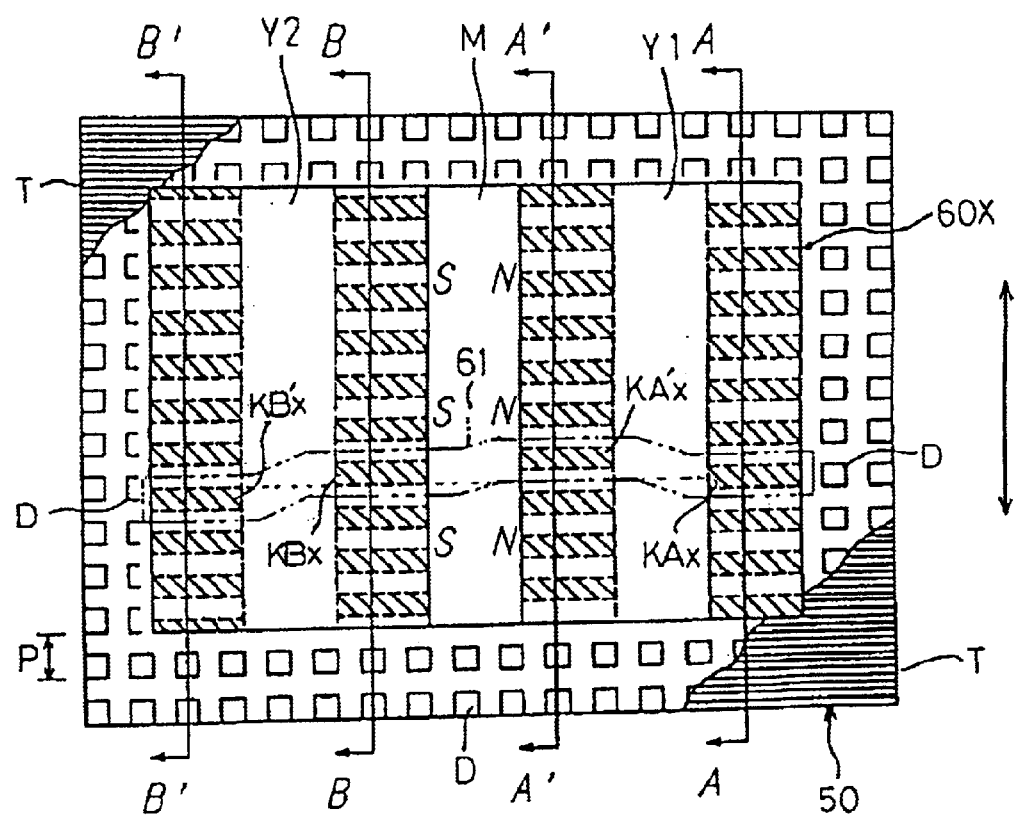
FIG. 3 is a plan view of the spatial phase relationship between the pole teeth of the X-axis movable member and platen dots.
Figure 4:
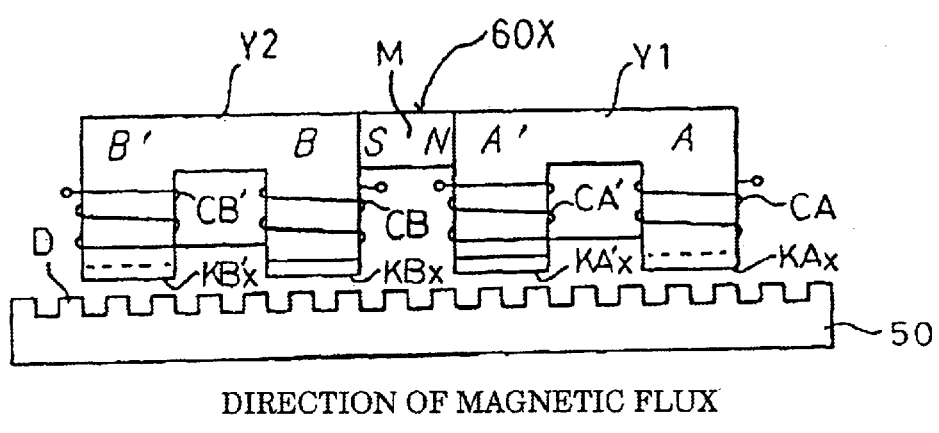
FIG. 4 is a side view of an X-axis movable member seen in the X-axial direction.

FIG. 1 is a perspective view of the general configuration of a two-phase planar linear motor, FIG. 2 is a perspective view of an X-axis movable member in the motor, FIG. 3 is a plan view of the spatial phase relationship between the pole teeth of the X-axis movable member and platen dots, FIG. 4 is a side view of an X-axis movable member seen in the X-axial direction; and FIGS. 5A to D are sectional views of the states cut along the line B'—B', line B—B, line A'—A', and line A—A in FIG. 3.

The two-phase planar linear motor is comprised of a platen body 50 having a platen surface 51 formed with a plurality of platen dots D arranged in a matrix and a composite movable member 70 comprised of two X-axis movable members 60X and two Y-axis movable members 20Y connected by a support plate 30 in an in-plane perpendicular relationship. The composite movable member 70 has a pressurized air ejection port (not shown) and moves planarly while floating slightly above the platen surface 51 of the platen body 50 by the blown pressurized air.

This two-phase planar linear motor is employed for example as an IC test handler or a part mounting machine.

The IC test handler is provided with a contact transfer which holds an IC (semiconductor integrated circuit device) at the entry position by suction, moves it to a test position, then descends to continue to press down terminals of the IC on the IC socket for a predetermined time, then suitably thereafter raises the IC and inserts it in an exit position. With this IC test handler, the platen body 50 is supported suspended upside down from the illustrated state. The composite movable member 70 moves planarly along the platen surface directly under the platen body 50 using the contrast transfer as a base.

The platen body 50, as explained later, has a stacked member comprised of a plurality of strip-shaped magnetic sheets T stacked together. As shown in FIG. 1 and FIG. 2, one of the parallel sheet edge surfaces is used as the platen surface 51. The strip-shaped magnetic sheets T are for example silicon steel sheets coated with insulating films of for example 0.35 to 0.5 mm thickness. The dot pitch P of the platen dots D (one spatial period) is for example several mm.

Each of the Y-axis movable members 20Y is a movable member advancing in the sheet edge direction (Y-axial direction) of the magnetic sheets T. The first and second yokes Y1 (Y2), like in the past, have stripe-shaped projecting pole teeth KA and KA' (KB and KB') parallel with the X-axis.

On the other hand, the pole teeth $KA_x$ and $KA'_x$ ($KB_x$ and $KB'_x$) of the first and second branched magnetic path legs A and A' (B and B') of the first yoke Y1 of each of the X-axis movable members 60X are flat in the Y-axial direction as shown in FIG. 4 and have equal spatial phases with respect to the closest dots D arranged in the sheet edge direction of the magnetic sheets T. The lengths in the Y-axial direction of the pole teeth $KA_x$ and $KA'_x$ ($KB_x$ and $KB'_x$) are two pitches=worth of length of the platen dots D. The intervals between them are also two pitches=worth of length. However, the pole teeth $KA_x$ and $KA'_x$ ($KB_x$ and $KB'_x$) are repeatedly arrayed for each dot pitch (one spatial period=P) in the normal direction (X-axial direction) of the joined surfaces of the magnetic sheets T to form rows of teeth. As shown in FIG. 3 and FIG. 5, the pole teeth $KA_x$ and $KA'_x$ ($KB_x$, $KB'_x$) comprising a laterally arranged set (pole tooth pattern) fitting in one pitch are arranged staggered within one dot pitch in the normal direction of the joined surfaces of the magnetic sheets T. Further, the spatial phases held with respect to the closest dots arranged in the normal direction are shifted by increments of the spatial phase difference (P/4).

Figure 5A:
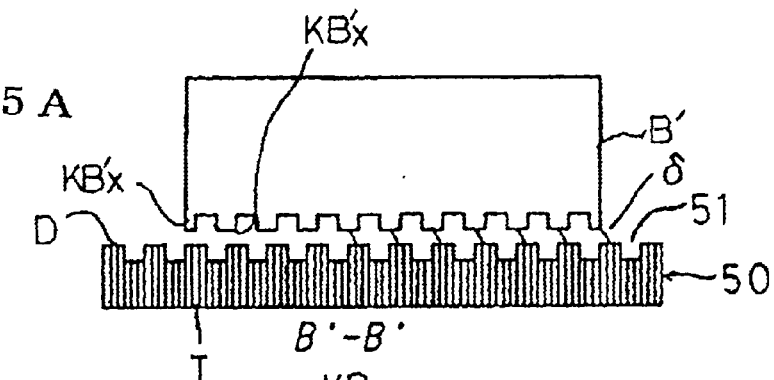
FIGS. 5A to 5D are sectional views of the states cut along the line B'—B', line B—B, line A'—A', and line A—A in FIG. 3.
Figure 5B:
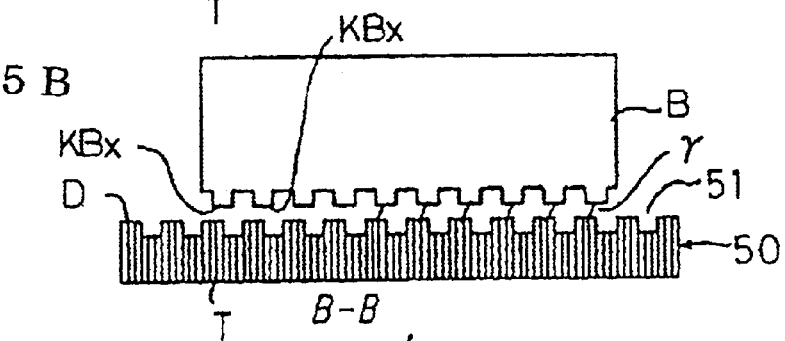
Figure 5C:
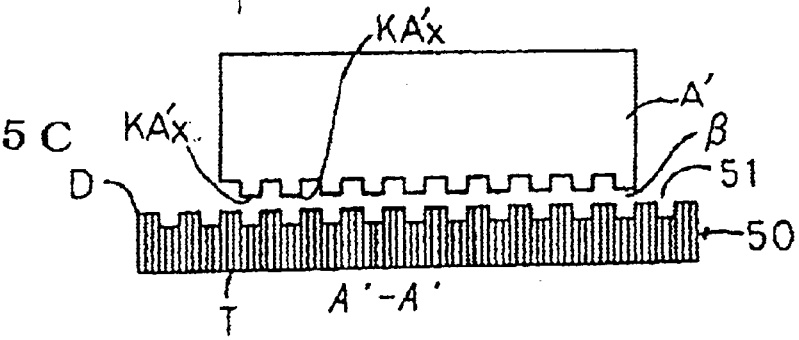
Figure 5D:
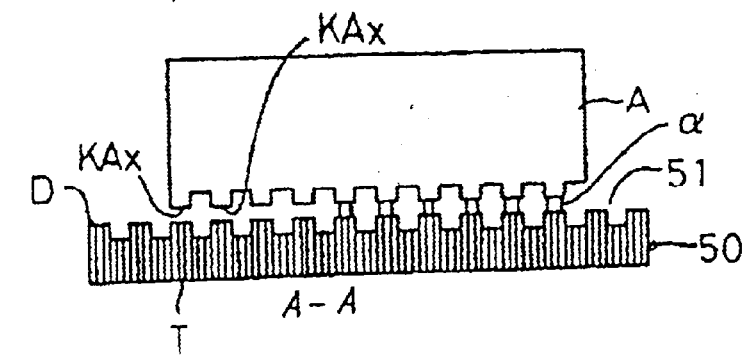
Figure 5D:

In the pole tooth pattern 61 surrounded by the two-dot chain line in FIG. 3, the pole tooth $KA_x$ is in register with the closest dot D, a concentrated magnetic flux portion α occurs in the air gap as shown in FIG. 5D, the pole tooth $KA'_x$ is staggered by exactly half a pitch with respect to the closest dot D, the air gap as shown in FIG. 5C becomes an extinguished magnetic flux portion α, the pole tooth $KB_x$ is staggered advanced by exactly P/4 from the closest dot D, the air gap shown in FIG. 5B becomes a pullback branched magnetic flux portion γ, the pole tooth $KB'_x$ is staggered delayed by exactly P/4 from the closest dot D, and the air gap shown in FIG. 5A becomes the thrust branching magnetic flux portion δ. Each X-axis movable member 60X has a group of patterns comprised of the above group of pole tooth patterns 61 repeated in the X-axial direction at a one-pitch period.

The pole teeth $KA_x$ and $KA'_x$ ($KB_x$ and $KB'_x$) of each pole tooth pattern 61 all have equal spatial phases with respect to the closest dots D arranged in the sheet edge direction (Y-axial direction) of the magnet sheets T, so while the X-axis movable member 60X does not receive thrust force in the Y-axial direction, the pole teeth $KA_x$ and $KA'_x$ ($KB_x$ and $KB'_x$) fit within one pitch in the X-axial direction, so a magnetic circuit for the advancing magnetic flux is formed along the sheet edge direction of the stacked member. In the state shown in FIG. 3 and FIG. 5 (excitation state due to A-phase current), the pole tooth $KB'_x$ generates a thrust branched magnetic flux portion δ, so in the process of switching from the A-phase current to the B-phase current, a thrust force acts on the pole tooth $KB'_x$ in the X-axial direction, in the second switching process, a thrust force acts on the pole tooth $KA'_x$ in the X-axial direction, in the third switching process, a thrust force acts on the pole tooth $KB_x$ in the X-axial direction, and in the fourth switching process, a thrust force acts on the pole tooth $KA_x$ in the X-axial direction. An X-axial direction thrust force acts successively on the four pole teeth of each pole tooth pattern 61 laterally elongated in the Y-axial direction by the cycle of combination of the concentrated magnetic flux portion α and branched magnetic flux portions γ and δ, whereby the X-axis movable member 60X moves translationally in the X-axial direction by a so-called "crawling motion". Of course, it moves translationally in the X-axial direction even in the case of a platen comprised of a block material.

In this way, since it is possible to realize an X-axis movable member 60X giving thrust in the normal direction of the joined surfaces of the stacked member, it is possible to realize utilization of a stacked member of magnetic sheets T as the platen body 50. Even if making the frequency of the drive period current (current pulse) higher and making the speed of advance higher, the thrust force does not fall that much up to the high-speed region (2 m/sec). Therefore, it becomes possible to realize a high speed, high thrust, and high efficiency linear motor.

The spatial phase relationship between the X-side pole teeth $KA_x$ and $KA'_x$ ($KB_x$ and $KB'_x$) of each X-axis movable member 60X and the platen dots D arranged in the X-axial direction at the platen 50 side is relative, so instead of giving a staggered arrangement among the pole teeth $KA_x$ and $KA'_x$ ($KB_x$ and $KB'_x$), it is possible to give a staggered arrangement among the platen dots D arranged in the X-axial direction at the platen body 50 side. The number of dots on the platen surface, however, is enormous, so this would be disadvantageous in the production of the platen body 50. It would be realizable however in the case of a platen of a small area or with the development of high precision techniques for production of platens.

Since a thrust force acts on the pole teeth switching from a thrust branched magnetic flux portion δ to a concentrated magnetic flux portion α, the thrust branched magnetic flux portion δ and the concentrated magnetic flux portion α occur at the pole teeth of the opposite yokes, so a rotational moment acting on the X-axis movable member 60X occurs in alternately forward and reverse directions and the X-axis movable member 60X moves translationally along with the rotational vibration. The higher the speed of travel, however, the smaller the ratio of the rotational vibration with respect to the speed of travel.

Here, considering the relationship between the dot pitch P of the platen 50 (same as pitch of pole teeth of X-axis movable member 60X) and the magnetic sheets T, the thickness of the magnetic sheets T may be less or more than the dot pitch, but for achieving high speed, high thrust, and high efficiency, it is preferably less than the dot pitch. Taking note of the pole teeth where the extinguished magnetic flux portion β occurs in the magnetic circuit, the pole teeth have no direct relevance to the thrust force or stability of the movable member. They are just so to say assigned in series. Further, the pole teeth where the extinguished magnetic flux portion β occurs differ the most among the pole teeth from the pole teeth where the concentrated magnetic flux portion α occurs. There is a spatial phase difference of half a pitch. Therefore, as in this example, in the case of a platen 50 using magnetic sheets T having a thickness within half of a pitch, the magnetic circuit formed along the sheet edge direction inherently finds it hard to hold magnetic coupling with pole teeth where the extinguished magnetic flux portion δ occurs, so there is no need to generate an alternating magnetic flux of a strength exactly extinguishing the bias magnetic flux and the degree of freedom of design is increased. This is also an advantage of using a stacked member as a platen. In the case of a three-phase drive, the thickness of the magnetic sheets should be no more than ⅓ of the dot pitch. Since the platen 50 is a stacked member of magnetic sheets T, it may be a stacked member with plastic or other nonmetallic materials sandwiched between dots in the X-axial direction.

Further, it is not necessary to provide recesses between the dots. The platen can also be fabricated easily. Further, the leakage magnetic flux can be reduced and a higher efficiency can be contributed to.

Figure 6:
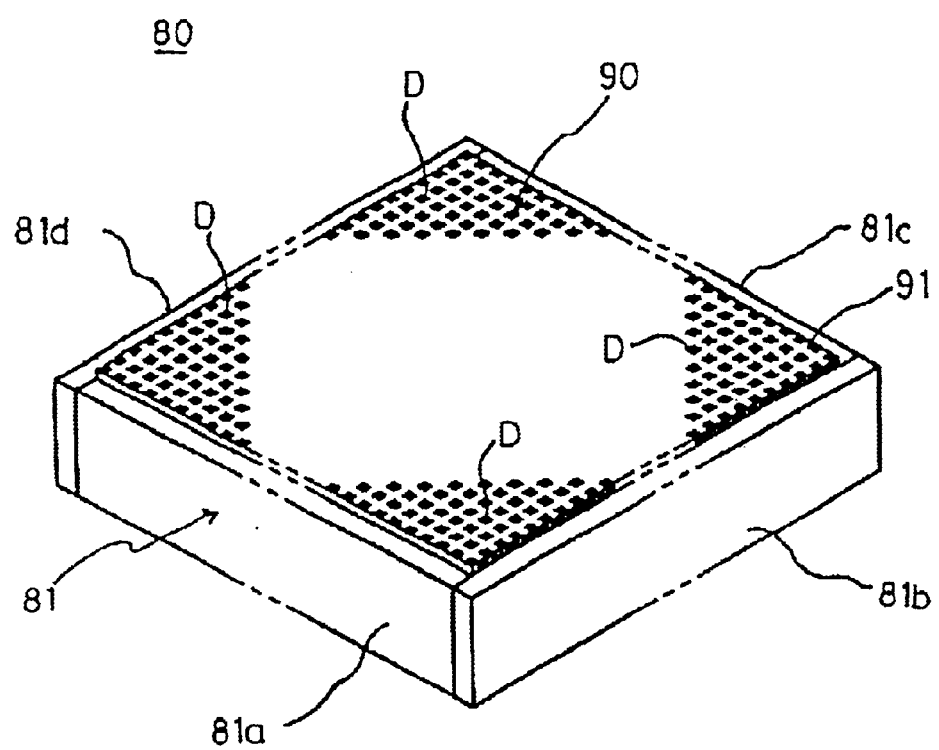
FIG. 6 is a perspective view of a platen structure according to an embodiment of the present invention.

Now, FIG. 6 is a perspective view of a platen structure according to an embodiment of the present invention. This platen structure 80 is comprised of a platen body 90 having a stacked member 91 comprised of a plurality of strip-shaped magnetic sheets (silicon steel sheets) stacked together and an outer frame 81 comprised of four side plates 81a to 81d surrounding the platen body 90 and connected with each other. The facing pair of the side plates 81a and 81c of the outer frame 81 abut against the two surfaces of the stacked member 91 in the stacking direction and clamp the stacked member 91 and are clamped by the other pair of the side plates 81b and 81d. Therefore, the platen structure 80 is a box structure and can suppress torsional deformation of the stacked member 91.

(First Embodiment)

Figure 7:
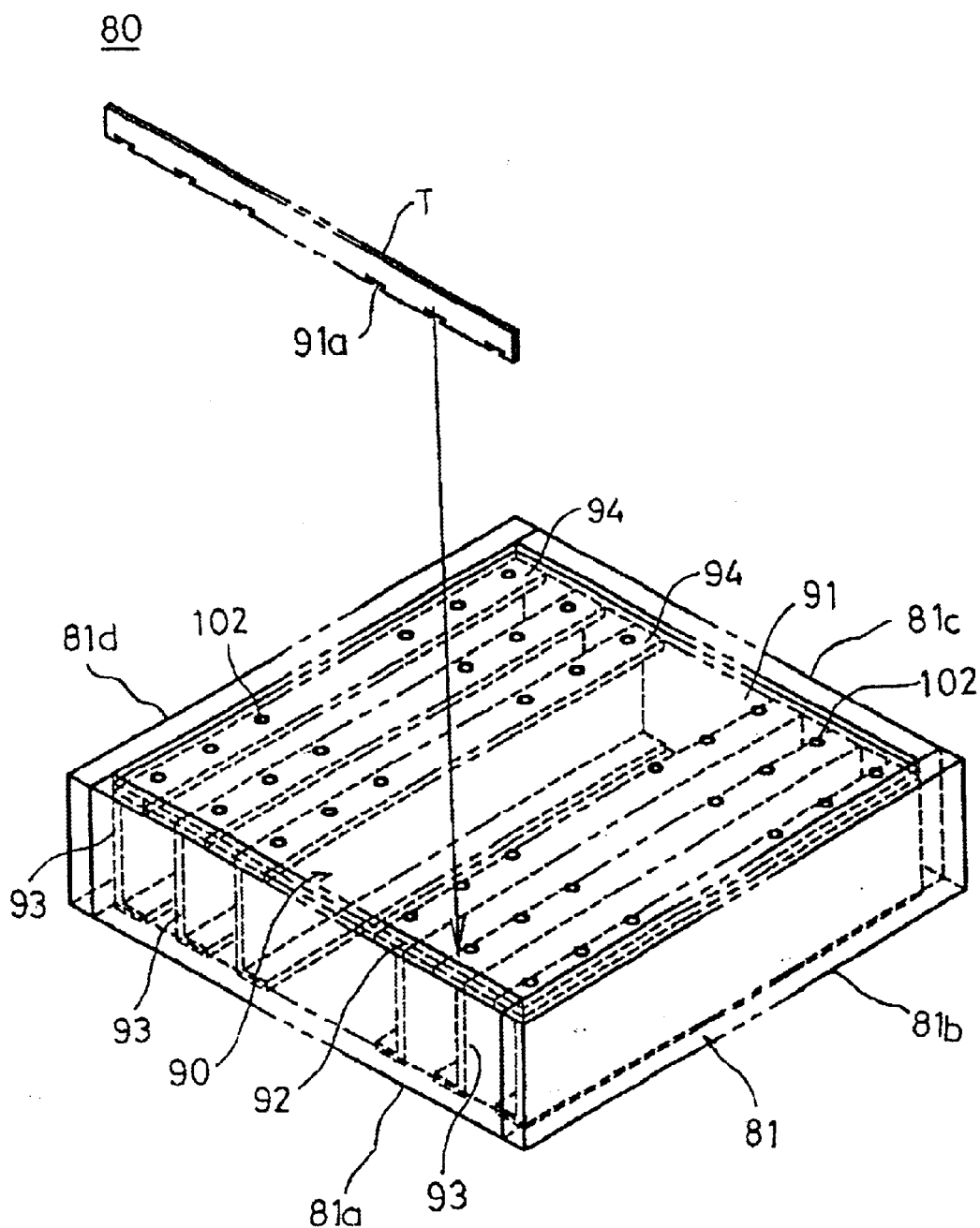
FIG. 7 is a perspective view of a platen according to a first embodiment of the present invention.
Figure 8:
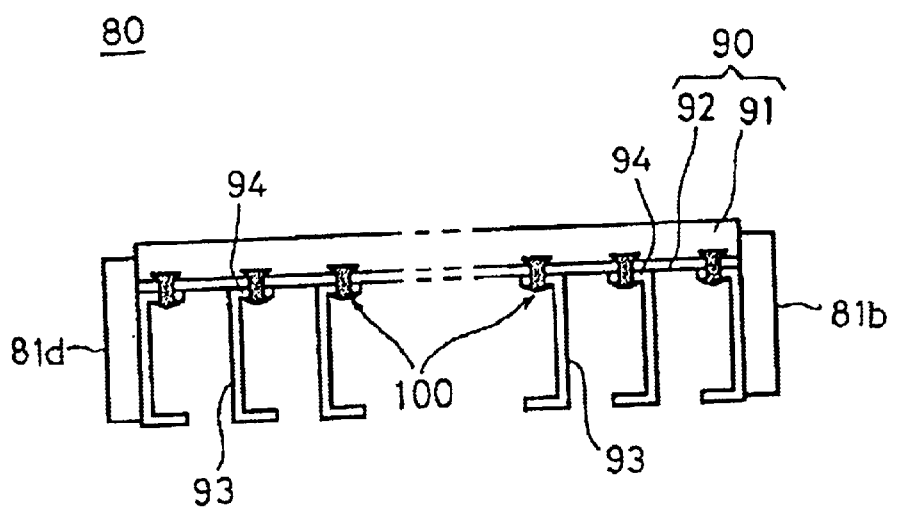
FIG. 8 is a front view of a platen according to the first embodiment of the present invention.
Figure 9:
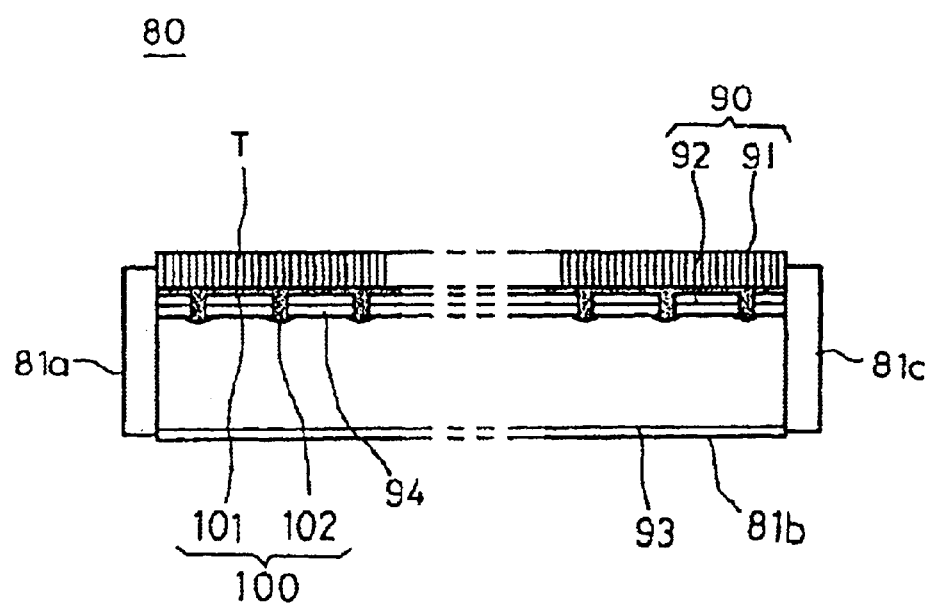
FIG. 9 is a side view of a platen according to the first embodiment of the present invention.

FIG. 7 is a perspective view of a platen according to a first embodiment, FIG. 8 is a front view of the same, and FIG. 9 is a side view of the same. The platen body 90 has a backing plate 92 placed against the parallel sheet edge surface forming the back surface of the stacked member 91. This backing plate 92 is supported at its back surface by a plurality of U-shaped cross-section connecting beam members 93. The connecting beam members 93 are provided at regular discrete positions in the sheet edge direction. As shown in FIG. 8, the connecting beam members 93 allocated to the left and right of the center of the stacked member 91 face each other in opposite directions. Each connecting beam member 93 has a top bent side end 94. The top bent side end 94 extends in a perpendicular direction of the sheet edge direction as shown in FIG. 9. Joints 100 of a fluid hardening material forming the binding means injected between the top bent ends 94, the backing plate 92, and the back surface of the stacked member 91 and binding the large number of magnetic sheets T are formed molded along the top bent ends 94.

Figure 10:
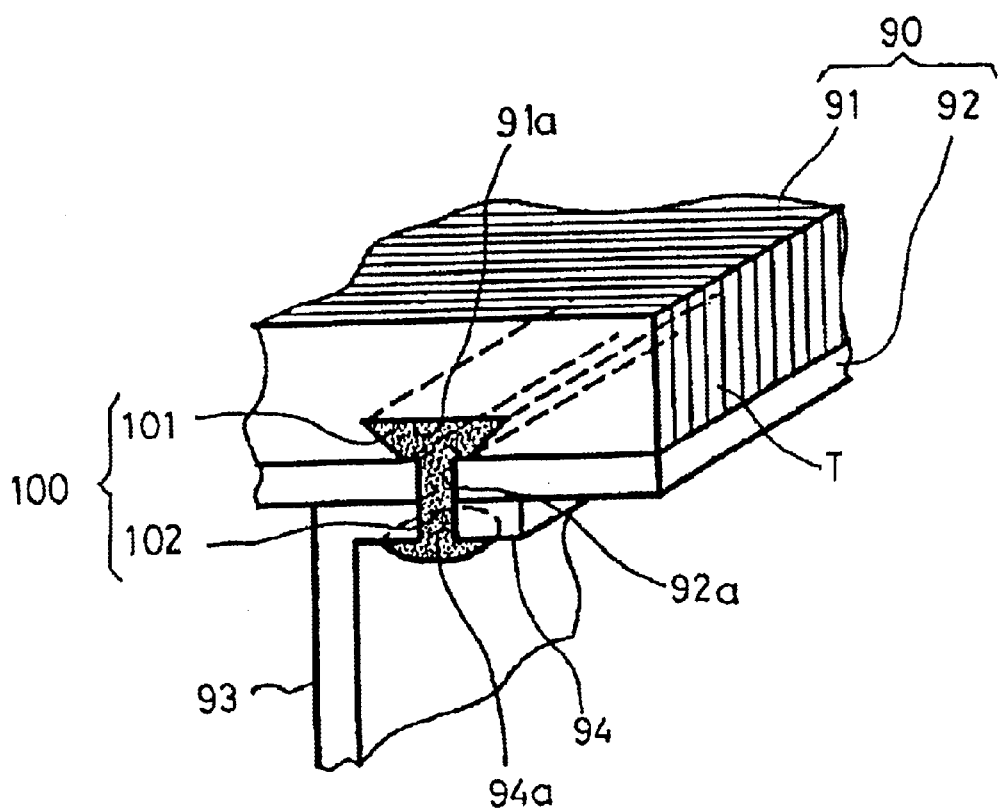
FIG. 10 is a perspective view of a binding structure of a stacked member in a platen according to the first embodiment of the present invention.

As shown in FIG. 10, the back surface of the stacked member 91 is formed with dovetail grooves 91a along the direction perpendicular to the sheet edge direction. Further, the backing plate 92 has a plurality of first through holes 92a arranged discretely in longitudinal lines across the strip-shaped portions facing the dovetail grooves 91a. The top bent ends 94 have second through holes 94a arranged discretely in longitudinal lines across the beam longitudinal direction and in register with the first through holes 92a. An adhesive, molten resin material, molten metal material, or other fluid material is injected from the openings of the second through holes 94a or the openings of the dovetail grooves 91a to fill the dovetail grooves 91a and the through holes 94a and 92a and form joints 100 of the cured fluid hardening material. The joints 100 of the fluid hardening material are comprised of the molded connecting parts 101 filling and hardening in the dovetail grooves 91 and molded joining parts 102 filled in the through holes 94a and 92a connected with the molded connecting parts 101 and holding together the backing plate 92 and the top bent ends 94 of the connecting beam members 93. The molded connecting parts 101 are male molded parts corresponding to the dovetail grooves, while the filled joining parts 102 are rivet-shaped molded parts having rivet heads exposed at the top bent ends 94 and riveted to the top bent ends 94. Therefore, the stacked member 91 is bound by the molded connecting parts 101, while the platen body 90 and the connecting beams 92 are held together by the molded joining parts 102. The fluid hardening material used in this example is an aluminum alloy, but it may also be an adhesive, resin material, or filler material used in welding. The through holes may be formed by boring, so this contributes to a reduction of the cost.

Figures 11A, 11B, 11C:
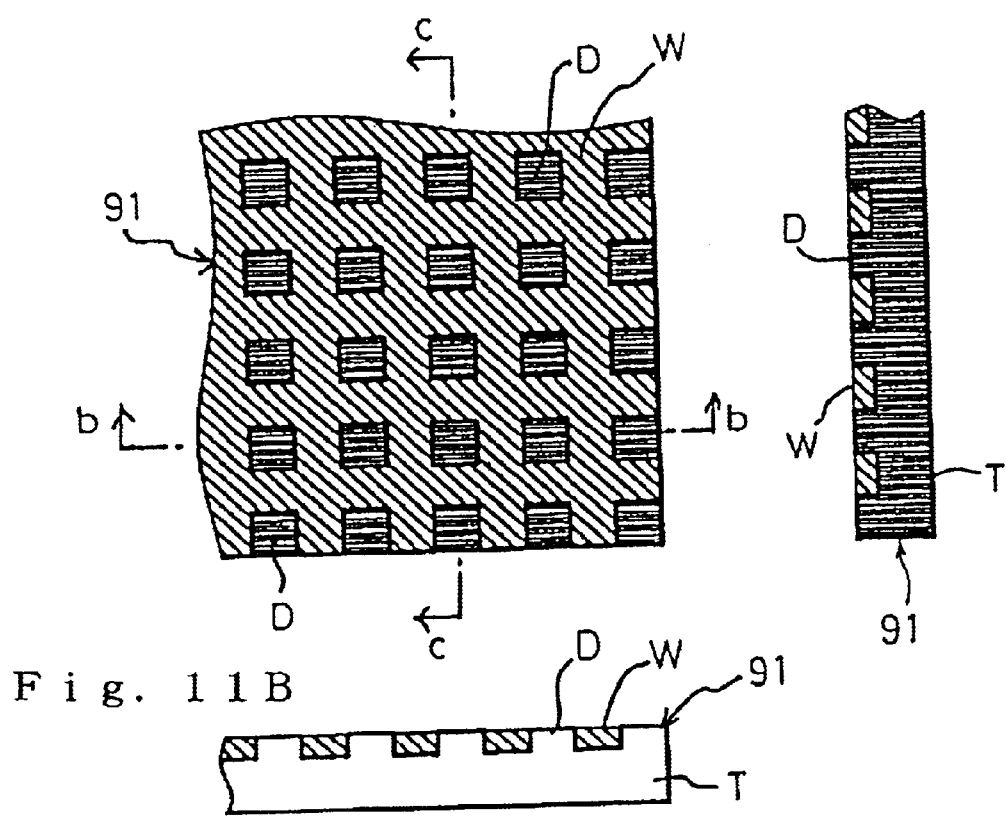
FIG. 11A is a plan view of the stacked member.
FIG. 11B is a sectional view cut along the line b—b of FIG. 11A.
FIG. 11C is a sectional view cut along the line c—c of FIG. 11C.

FIG. 11A is a plan view of the stacked member 91, FIG. 11B is a sectional view cut along the line b—b of FIG. 11A, and FIG. 11C is a sectional view cut along the line c—c of FIG. 11C. The front surface of the stacked member 91 is formed with platen dots D interfitting with projections of the strip-shaped magnetic sheets T and forming planar square shapes arranged in a matrix. The lattice grooves between the dots are filled with a resin material W, and the surface is finished smooth. The platen dots D may be formed by shape-cutting electrodischarge machining or etching the surface of the stacked member 91 after binding the stacked member 91 by the above binding means, but they may also be formed by using as strip-shaped magnetic sheets T of a width of about 5 cm fine blankings provided with platen dot projections (high precision punched and pressed product), stacking a plurality of these strip-shaped magnetic sheets T, and aligning the platen dot projections. In this case, it is possible to eliminate the step of forming the platen dots and possible to greatly reduce the costs.

(Second Embodiment)

Figure 12:
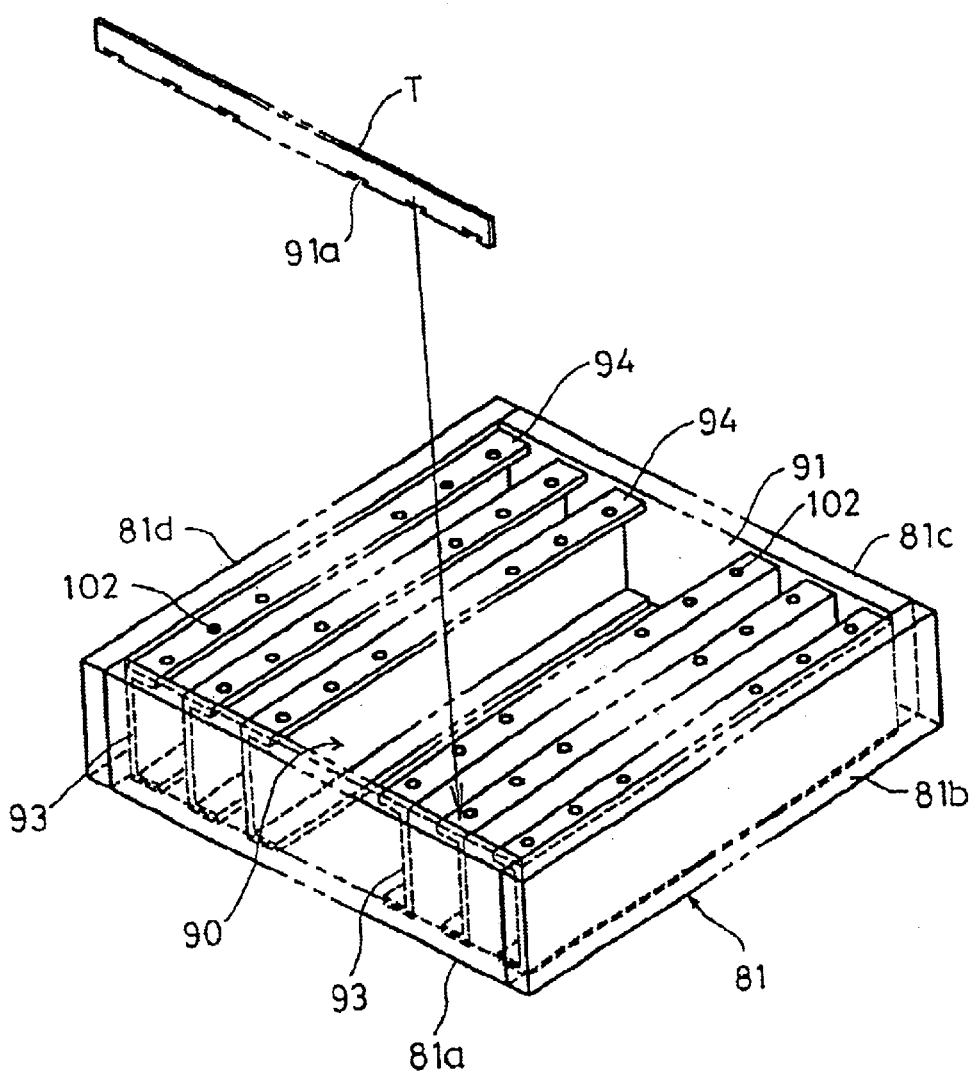
FIG. 12 is a perspective view of a platen according to a second embodiment of the present invention.
Figure 13:
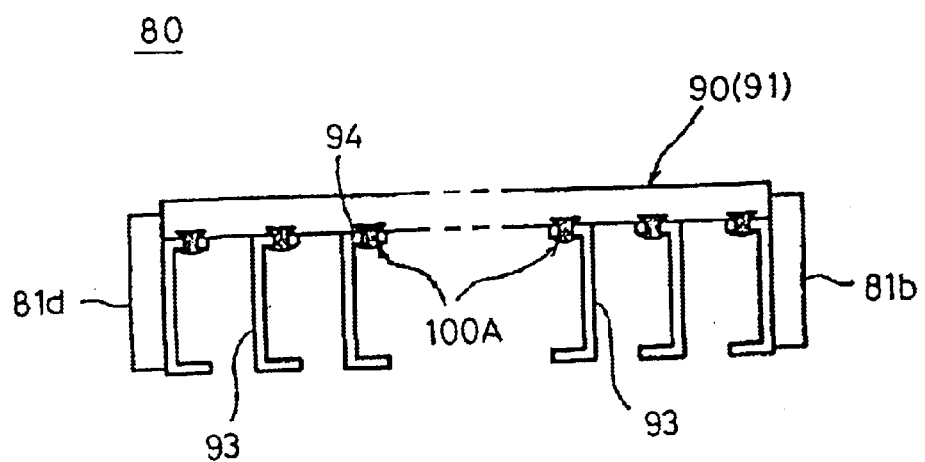
FIG. 13 is a front view of a platen according to the second embodiment of the present invention.
Figure 14:
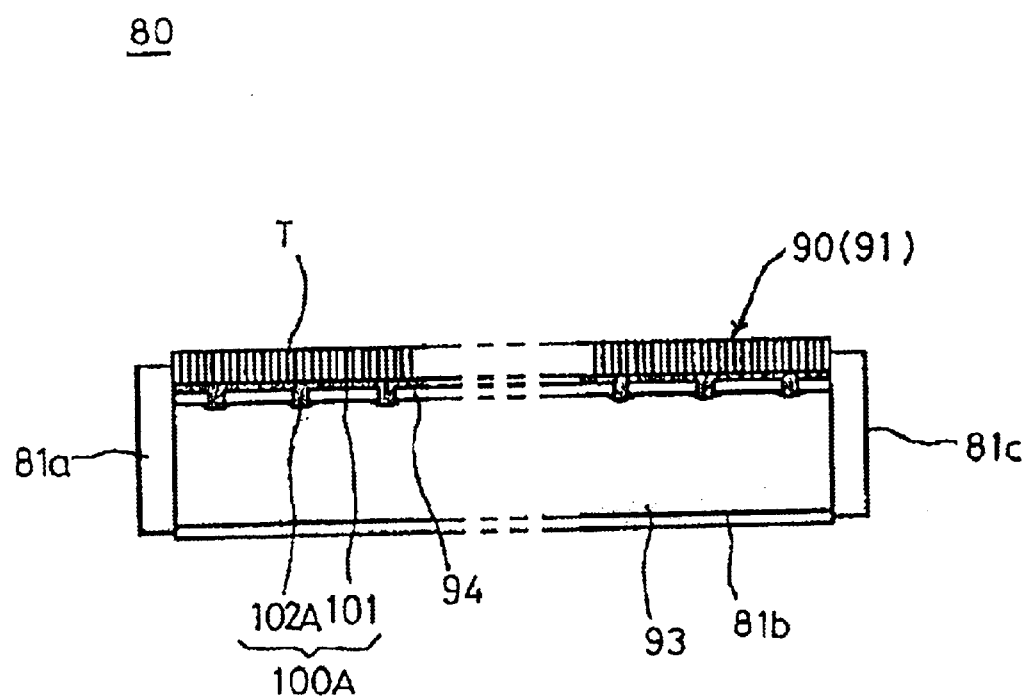
FIG. 14 is a side view of a platen according to the second embodiment of the present invention.

FIG. 12 is a perspective view of a platen according to a second embodiment of the present invention, FIG. 13 is a front view of the same, and FIG. 14 is a side view of the same. Note that in this example, portions the same as those of the first embodiment are assigned the same reference numerals and explanations thereof are omitted.

Figure 15:
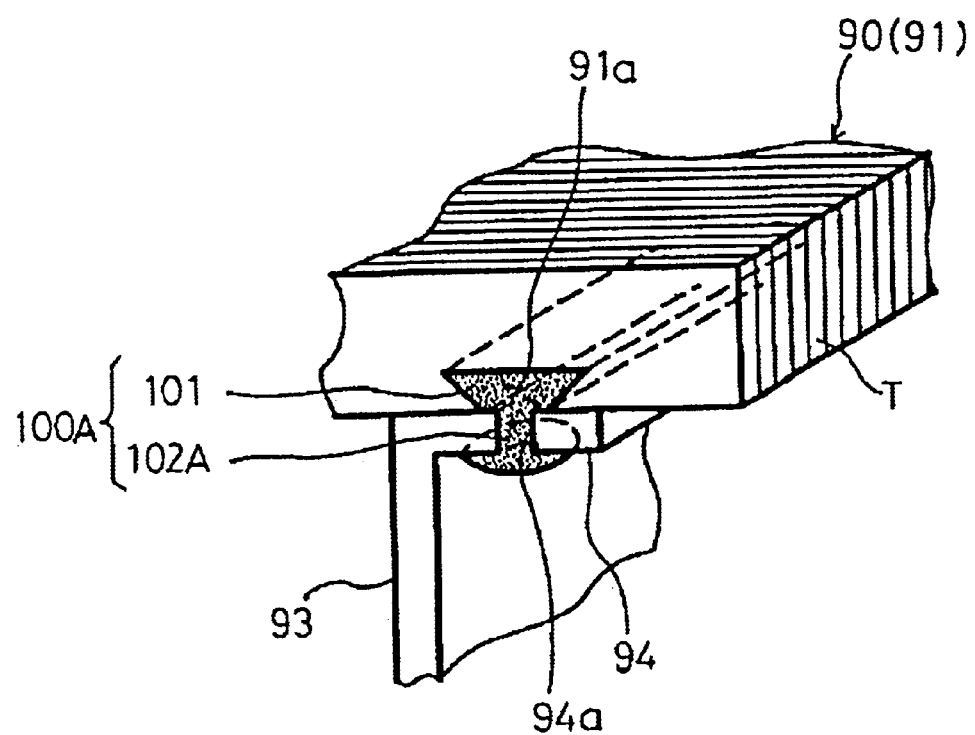
FIG. 15 is a perspective view of a binding structure of a stacked member in a platen according to the second embodiment of the present invention.

The platen body 90 of the present example is not provided with a backing plate 92 like in the first embodiment. The stacked member 91 is supported directly by the connecting beams 93. In this example as well, further, there are joints 100A of a fluid hardening material forming the binding means similar to the first embodiment, but as shown in FIG. 15, they form molded joining parts 102A of rivet shaft lengths shorter by the amount of the absence of the through holes 92a of the backing plate 92 as in the first embodiment. The joints 100A of the fluid hardening material exhibit a binding function and a connecting function, but in the present example, since the backing plate 92 is not provided, while the stacked member 91 can be firmly fastened by the outside frame 81 (see FIG. 6), deformation of the outside frame 91 may not be sufficiently suppressed at the time of transport of the platen etc. If the outside frame 81 itself deforms, some strain and deformation easily occurs in the stacked member 91.

Figure 16:
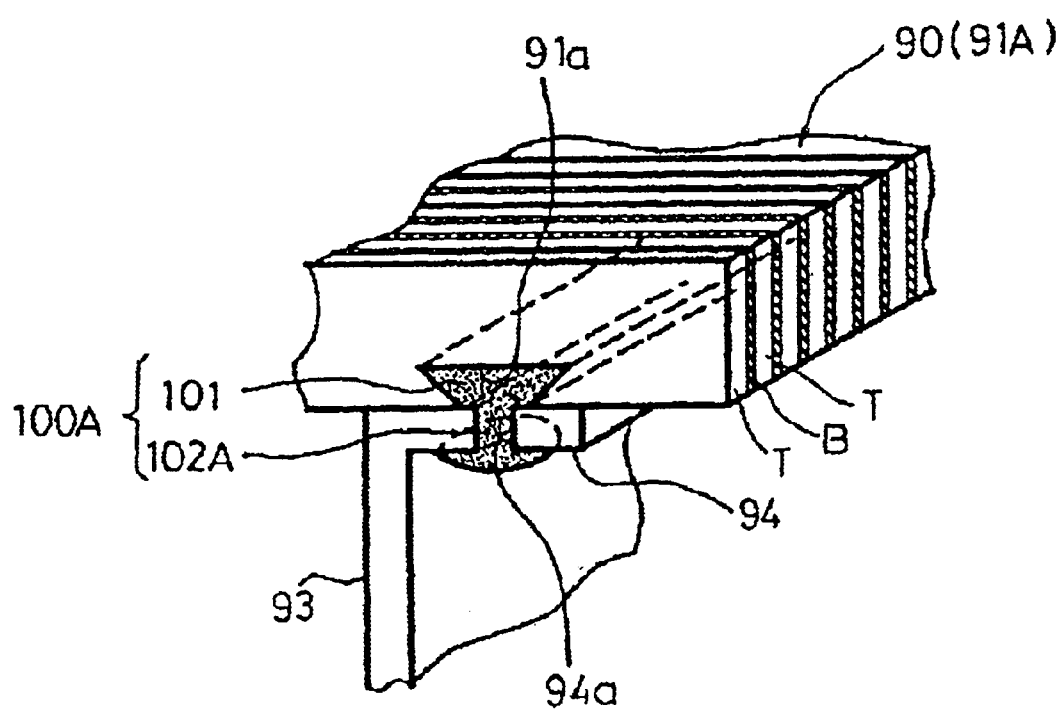
FIG. 16 is a perspective view of a binding structure of a stacked member with bonding layers interposed in the platen according to the second embodiment of the present invention.

Therefore, as shown in FIG. 16, as the stacked member 91A, one interposing bonding layers (adhesive layers) B of an epoxy resin etc. between the adjoining magnetic sheets T is suitable. With a stacked member 91A interposed with bonding layers B, if injecting a molten metal material, hardening will be instantaneous and the deterioration of the bonding layers B will not be that much of a problem. Rather, there is the advantage that quick curing of the bonding layers B can be expected by the surplus heat and the drying and aging step can be simplified.

(Third Embodiment)

Figure 17:
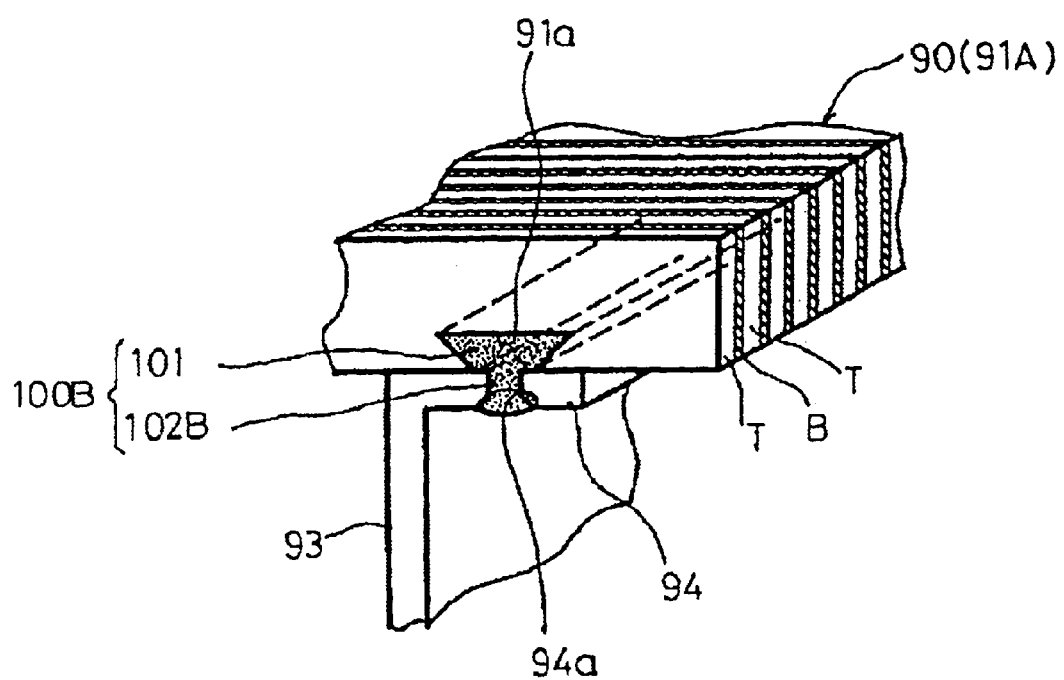
FIG. 17 is a perspective view of a binding structure according to a third embodiment of the present invention.

FIG. 17 is a perspective view of a binding structure according to a third embodiment. In this binding structure, the openings of the through holes 94b formed in the top bent ends 94 of the connecting beam members are tapered. The molded joining parts 102B of the joints 100B of the fluid hardening material have flat top, saucer-shaped rivet heads at the bottom surfaces of the top bent ends 94. The saucer-shaped rivet heads of the molded joining parts 102 have a high shear resistance and can improve the holding and joining strength with the connecting beam members 93.

(Fourth Embodiment)

Figure 18:
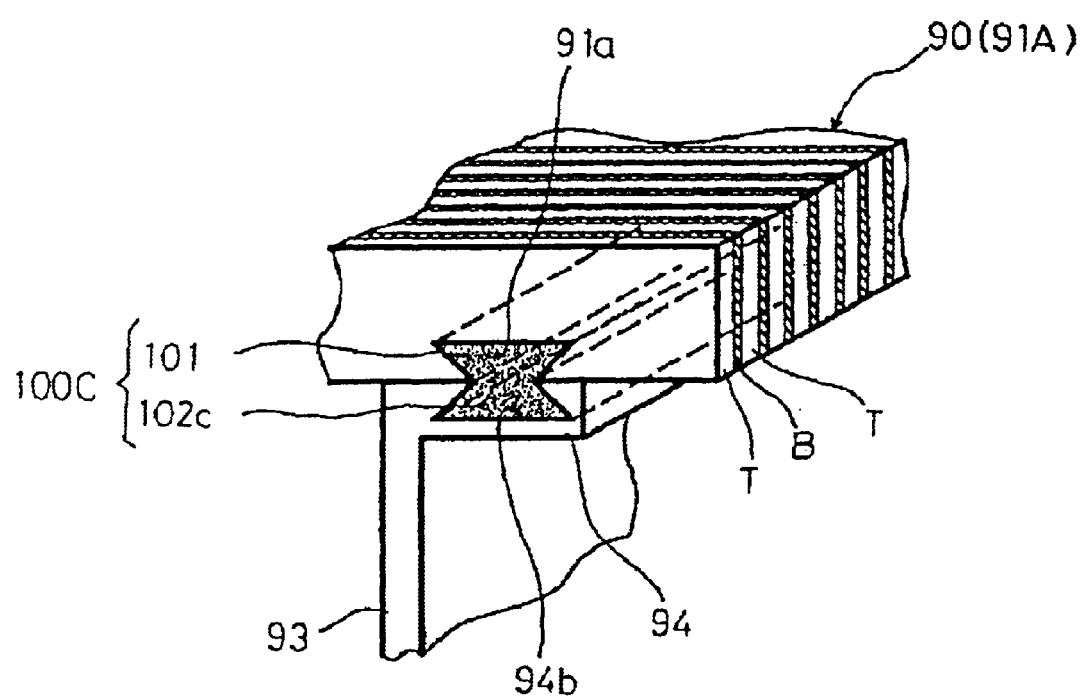
FIG. 18 is a perspective view of a binding structure according to a fourth embodiment of the present invention.

FIG. 18 is a perspective view of a binding structure according to a fourth embodiment. In this binding structure, going further from the fourth embodiment, dovetail grooves 94b similar to the dovetail grooves 91a of the stacked member 91A are also formed in the beam longitudinal direction in the top bent ends 94 of the connecting beam members, and the molded joining parts 102C of the joints 100C of the fluid hardening material are male molded parts corresponding to the dovetail grooves. Therefore, the joints 100C are formed as pegged dual bulging end molded parts and correspond to so-called molded rivets. The connecting strength with the connecting beam members 93 becomes extremely strong. However, the dovetail grooves 94b of the top bend ends 94 are generally formed by cutting, so some increase in manufacturing cost is invited.

(Fifth Embodiment)

Figure 19:
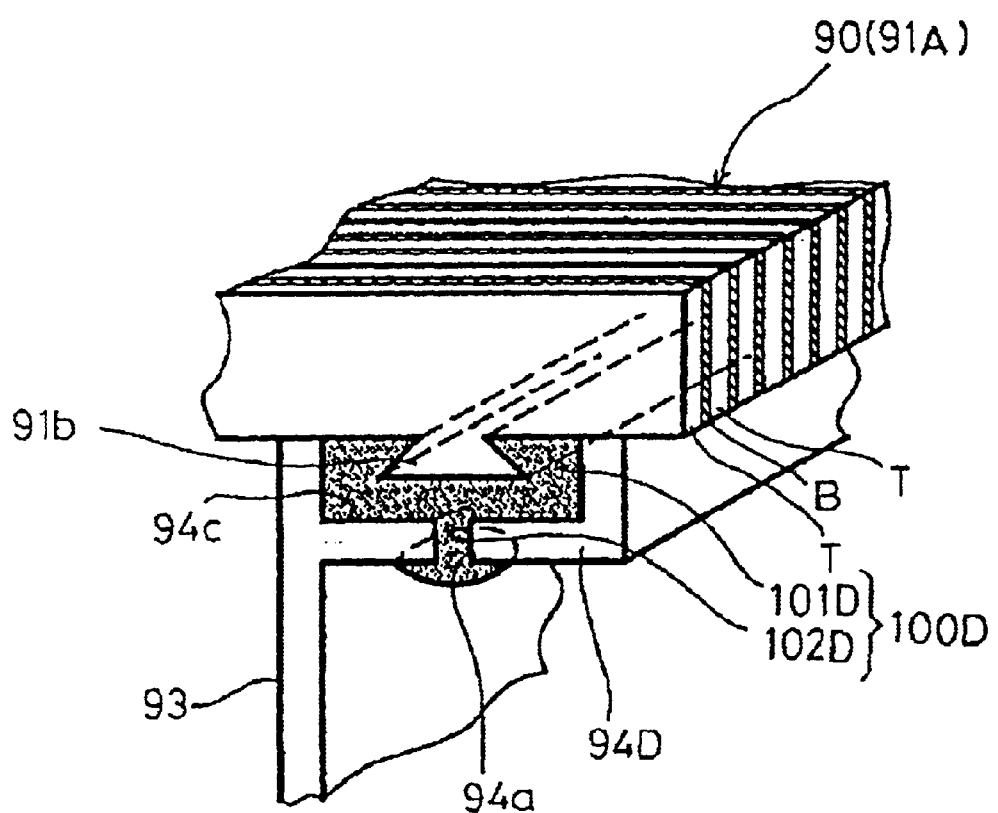
FIG. 19 is a perspective view of a binding structure according to a fifth embodiment of the present invention.
Figure 20:
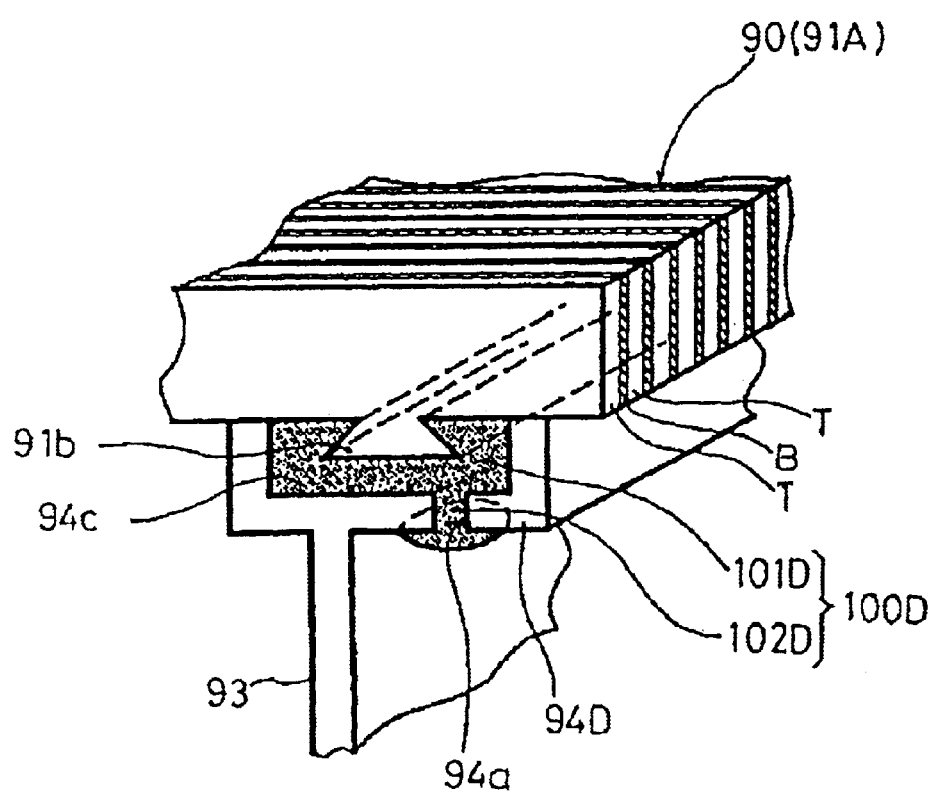
FIG. 20 is a perspective view of a modification of a binding structure according to a fifth embodiment of the present invention.

FIG. 19 is a perspective view of a binding structure according to a fifth embodiment. In this binding structure, dovetail section ridges 91b are formed at the stacked member 91A. Further, the connecting beam members 93 have side ends 94D with grooves 94c. At the bottoms of the grooves 94c, through holes 94a are formed discretely along the beam longitudinal direction. A fluid hardening material is injected in the state with the connecting beam members 93 abutting against the stack member 91A so that the grooves 94c surround the dovetail section ridges 91b. The joints 100D are comprised of female shaped molded connecting parts 101D filled in the remaining spaces in the grooves 94c and rivet-shaped molded joining parts 102D connecting with the same and filling the through holes 94a. In the state shown in FIG. 19, the through holes 94a are formed at the centers of the grooves 94c, but as shown in FIG. 20, it is also possible to form them at positions offset from the centers of the grooves 94c. According to this configuration, the filling area in the stacked member 91A becomes broader, so the binding function is reinforced.

The connecting beam members 93 having the grooved side ends of the shapes shown in FIG. 19 and FIG. 20 may be difficult to acquire as finished parts, but for example it is possible to utilize the readily available steel members having grooved side ends. Note that two or more lines of through holes may also be provided.

Figure 21A:
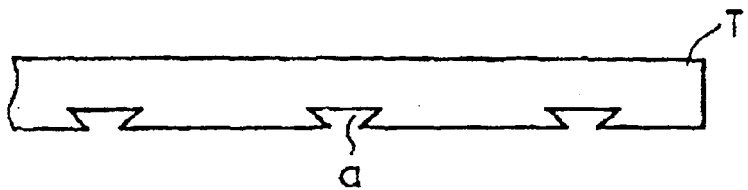
FIGS. 21A to 21G are plan views of the shapes of strip-shaped magnetic sheets.
Figure 21B:
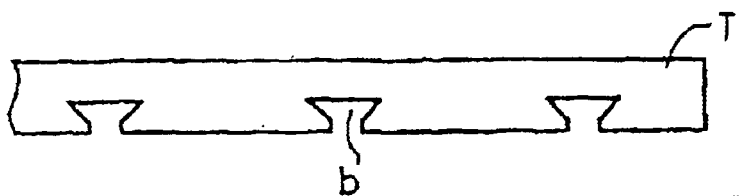
Figure 21C:
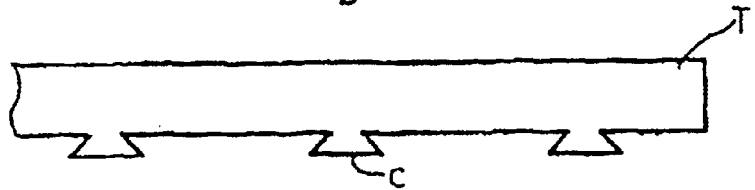
Figure 21D:
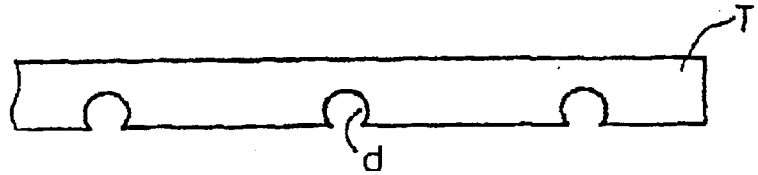
Figure 21E:
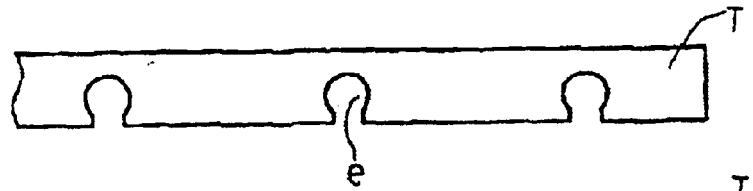
Figure 21F:
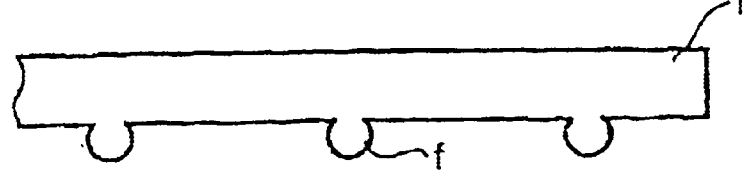

The dovetail grooves and other female parts and the dovetail ridges and other male parts are formed at the back surface of the stacked member 91A so as to obtain mechanical mating parts with the filled fluid hardening material by self molding and add a mechanical anchoring action on the filling power of the fluid hardening material. The stacked member 91A with the female parts or male parts can be obtained by arranging and stacking strip-shaped magnetic sheets T with notches or projections. As the strip-shaped magnetic sheets T, for example, there are ones having dovetail section notches a as shown in FIG. 21A, ones having dovetail section notches b with straight necks formed at the front edges as shown in FIG. 21B, ones having partially circular section notches d as shown in FIG. 21D, and ones having partially circular section notches e with straight necks formed at the front edges as shown in FIG. 21E. Each of these notches should be one having a narrow opening and a broad interior and exhibiting a holding action. Further, the sheets may be ones having dovetail section projections c as shown in FIG. 21C or ones having partially circular section projections f as shown in FIG. 21F. If using magnetic sheets T having projections, there is the advantage that the heat effect will not easily reach the platen surface. If using magnetic sheets T having notches, it is possible to limit the runners naturally, so it is possible to simplify the processing work at the connecting beam member 93 side. Further, since there are no parts sticking out, there is the advantage that handling of the magnetic sheets T becomes easy.

(Sixth Embodiment)

Figure 21G:
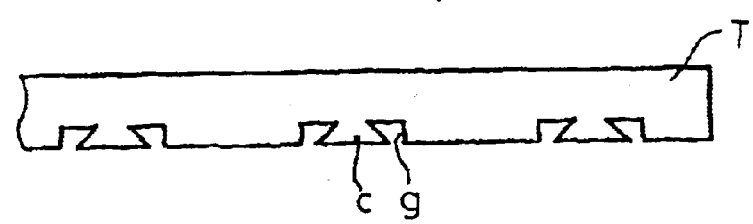
Figure 22:
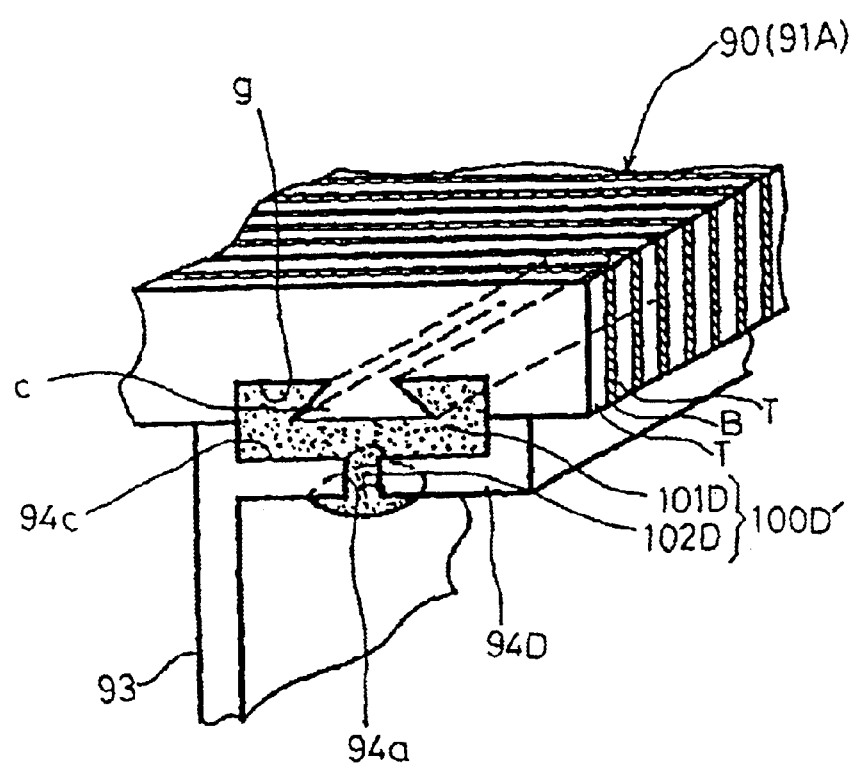
FIG. 22 is a perspective view of a binding structure according to a sixth embodiment of the present invention.

FIG. 22 is a perspective view of a binding structure according to a sixth embodiment. The stacked member 91A of the present example is comprised using magnetic sheets T having dovetail section projections c in notches g as shown in FIG. 21G. Joints 100D= similar to the joints 100D shown in FIG. 19 are formed by filling these. The depth of the grooves 94c of the connecting beam members 93 can be made shallower by the extent of the depth of the notches g. Not only is the work for forming the grooves easy, but also the filling power of the fluid hardening material in the notches g is improved and the binding action increased. In particular, when using a molten metal material, sinkage occurs, so the clamping force on the dovetail section projections c increases.

(Seventh Embodiment)

Figure 23:
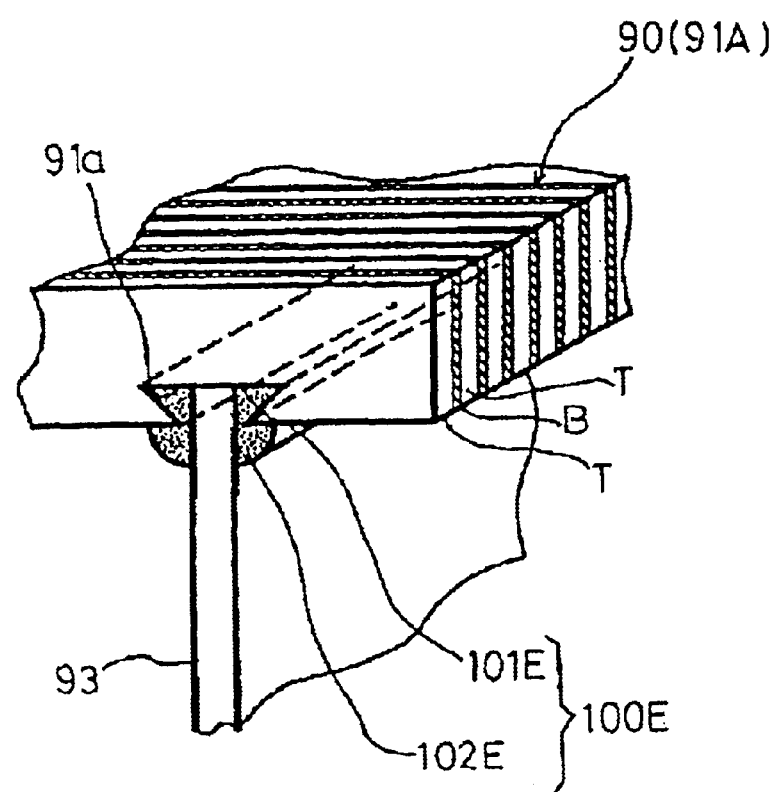
FIG. 23 is a perspective view of a binding structure according to a seventh embodiment of the present invention.
Figure 24:
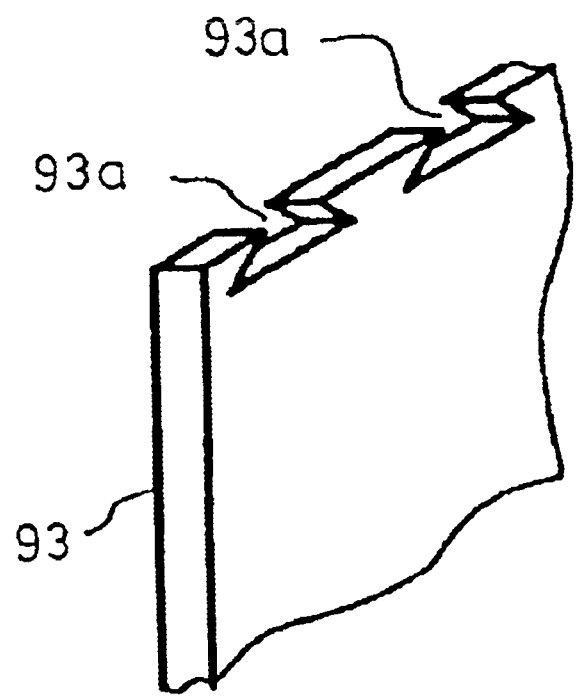
FIG. 24 is a perspective view of a side end of a connecting beam member used in the seventh embodiment.

FIG. 23 is a perspective view of a binding structure according to a seventh embodiment. In this binding structure, as shown in FIG. 24, connecting beam members 93 having a plurality of dovetail section notches 93a formed discretely along the beam longitudinal direction at the side end surface are used. The side end surfaces of the connecting beam members 93 are made to abut against the bottom surfaces of the dovetail section grooves 91a of the stacked member 91A and in that state a fluid hardening material is injected to obtain the joints 100E. The molded joining parts 102E connecting with the molded connecting parts 101E are rivet-shaped molded parts formed by the material overflowing from the clearances between the front edges of the dovetail section grooves and the surfaces of the connecting beam members 93. While not shown in FIG. 22, in the molded connecting parts 101E, the fluid hardening material is filled in the dovetail section notches 93a as well, so the molded connecting parts 101E and the side ends of the connecting beam members 93 form through structures in the dovetail section grooves 91a. The molded connecting parts 101 have a connecting function in addition to a binding function. Further, the joints 100E realize double connecting structures, so the connection strength is firm. Further, the dovetail section notches 93a can be formed by melting. This contributes to reduced cost.

(Eighth Embodiment)

Figure 25:
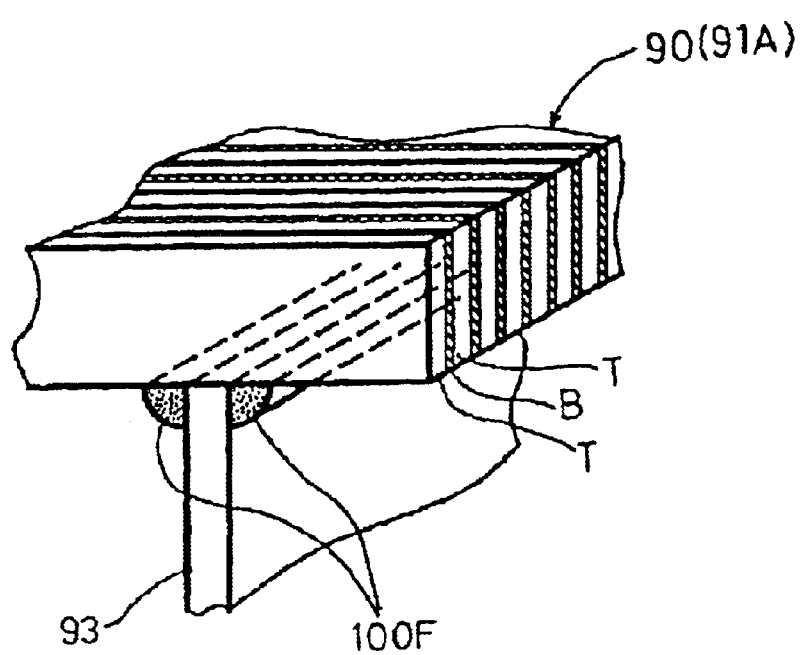
FIG. 25 is a perspective view of a binding structure according to an eighth embodiment of the present invention.

FIG. 25 is a perspective view of a binding structure according to an eighth embodiment. This binding means is the T-shaped welded joint 100F obtained by bringing a side surface of a connecting beam member 93 into abutment with the back surface of the stacked member 91A in a T-shape and fillet welding the abutted surfaces along them by laser beam welding. The fillet welds have a binding function and connecting function. This binding means is the simplest in structure, but laser beam welding, not arc welding or gas welding, is required. Laser beam welding can keep the welding zone narrow and enables welding in a short time, so can suppress to the maximum extent the heat effect to the surface of the stacked member 91A forming the base material. The laser beam welding is performed while cooling at least the front surface side of the stacked member 91A.

Figure 26:
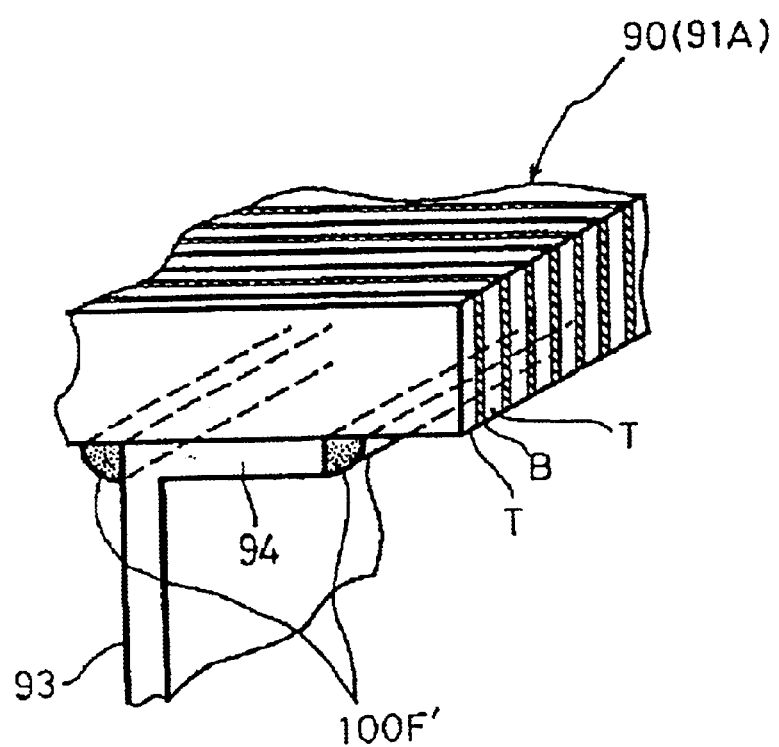
FIG. 26 is a perspective view of modification of a binding structure according to an eighth embodiment of the present invention.

When the side ends of the connecting beam members 93 are the plate edges, the range of support of the stacked member 91A is limited to the thickness dimension of the plates. If fillet welding the two surfaces of a plate, the result is the T-shaped welded joint 100F. The fillet welds are close to each other across the distance of the plate thickness, so thermal strain etc. become superposed and become larger at the abutted portions. Therefore, as shown in FIG. 26, it is suitable to use connecting beam members 93 having inverted L-shaped bent side ends 94 and to weld with the outer surfaces of the bent side ends 94 in abutment with the edges. The support becomes broader in range and stabler and the welded joints 100F= with fillet welds separated from each other by the width of the bent side ends 94 can be obtained, so overlap of the thermal strain etc. can be avoided.

(Ninth Embodiment)

Figure 27:
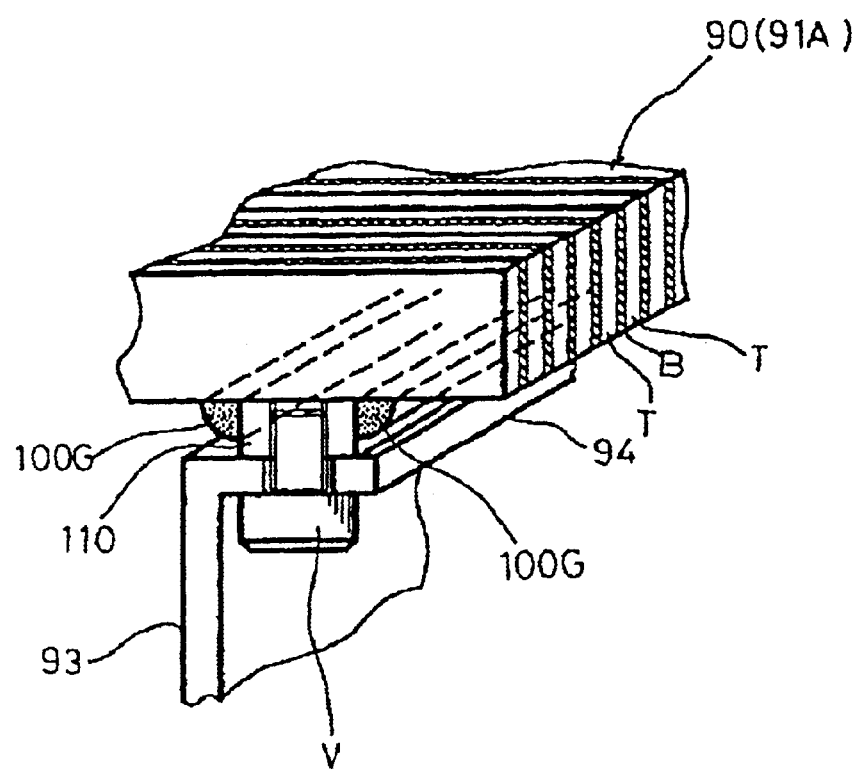
FIG. 27 is a perspective view of a binding structure according to a ninth embodiment of the present invention.

FIG. 27 is a perspective view of a binding structure according to a ninth embodiment. In this binding means, long spacers 110 placed against the outside surfaces of the bent side ends 94 and fastened by bolts V are used. The abutted edges of the long spacers 110 and the back surface of the stacked member 91A are fillet welded along them by laser beam welding to form the welded joints 100G. When the welding compatibility of the stacked member (silicon steel sheet stacked member) 91A and the connecting beam members (for example, aluminum members) 93 is poor, use should be made of long spacers 110 made of steel. This contributes to the reduction of weight of the platen.

(10th Embodiment)

Figure 28:
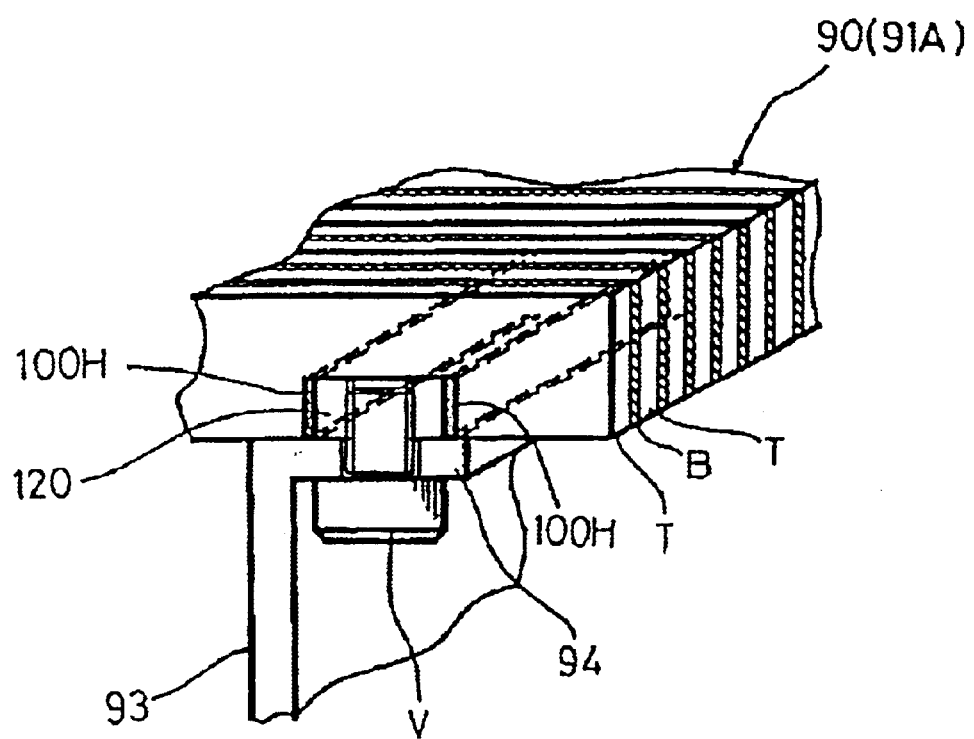
FIG. 28 is a perspective view of a binding structure according to a 10th embodiment of the present invention.

FIG. 28 is a perspective view of a binding structure according to a 10th embodiment. In this binding means, long male members 120 placed against the outside surfaces of the bend side ends 94 and fastened by bolts V are used. Grooves 91c of a rectangular sectional shape are formed in the back surface of the stacked member 91A. The long male members 120 are loosely fit into the grooves 91c and a fluid hardening material is injected into the clearances in that state to form joints 100H of the fluid hardening material. The joints 100H are molded in the clearances between the long male members 120 and the inside walls of the grooves, so the binding function is sufficient, but the connecting function can be said to be relatively weak. However, there is no difference in the case of a platen not providing hanging support.

Figure 29:
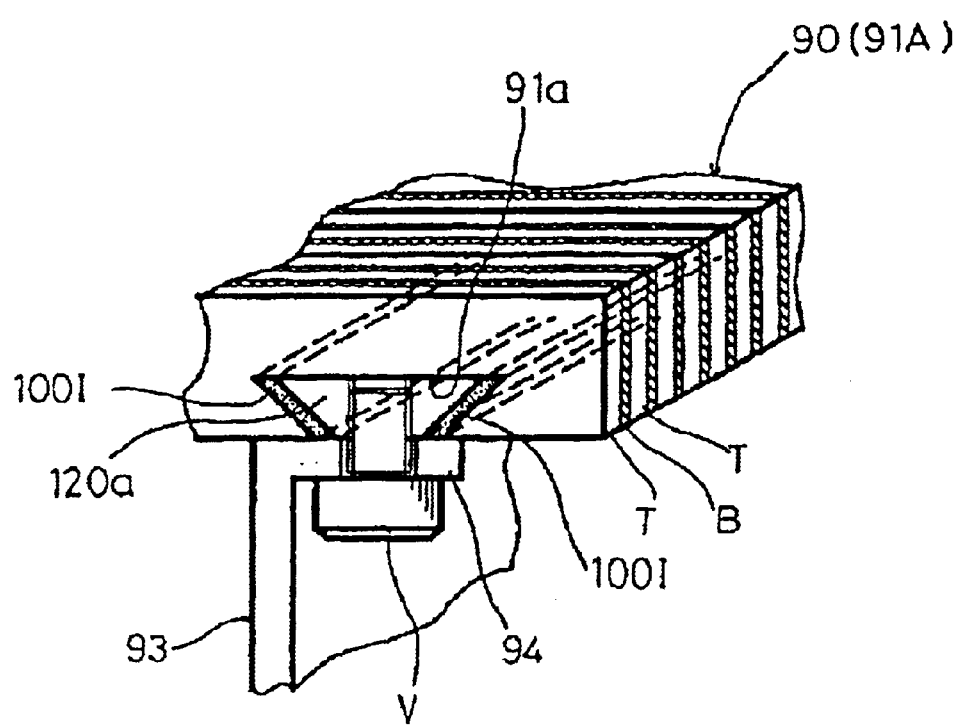
FIG. 29 is a perspective view of a binding structure according to an 11th embodiment of the present invention.
Figures 30A, 30B, 30C, 30D:
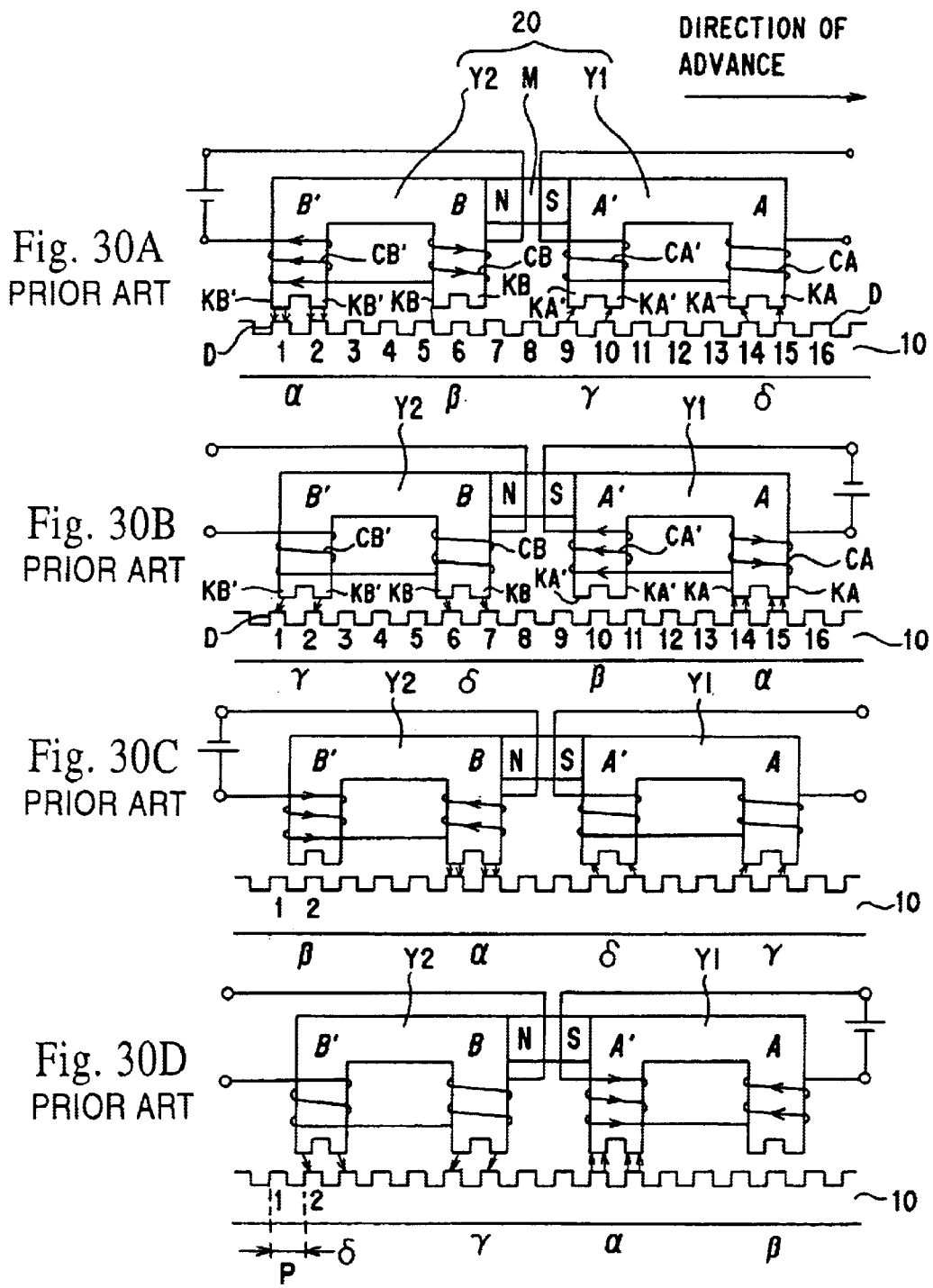
FIGS. 30A to 30D are progressive views of the operation for explaining the principle of a Sawyer motor (two-phase linear motor).
Figure 31:
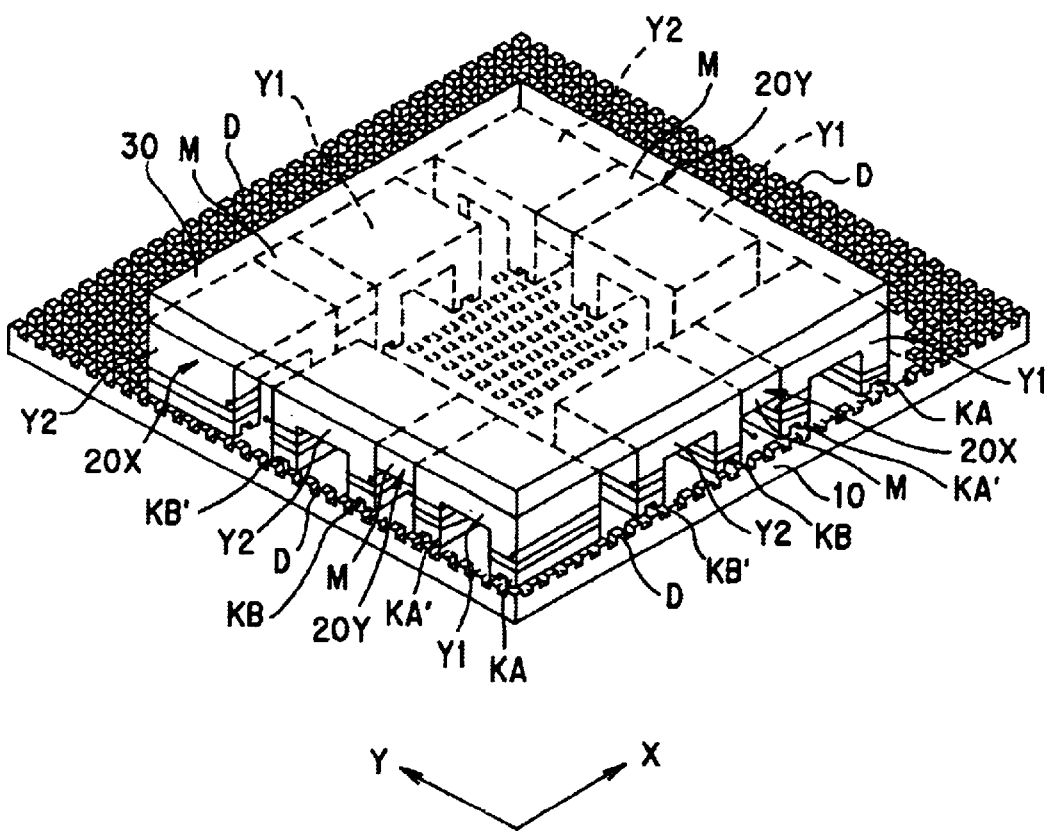
FIG. 31 is a perspective view of the schematic configuration of a conventional two-phase planar linear motor.
Figure 32A:
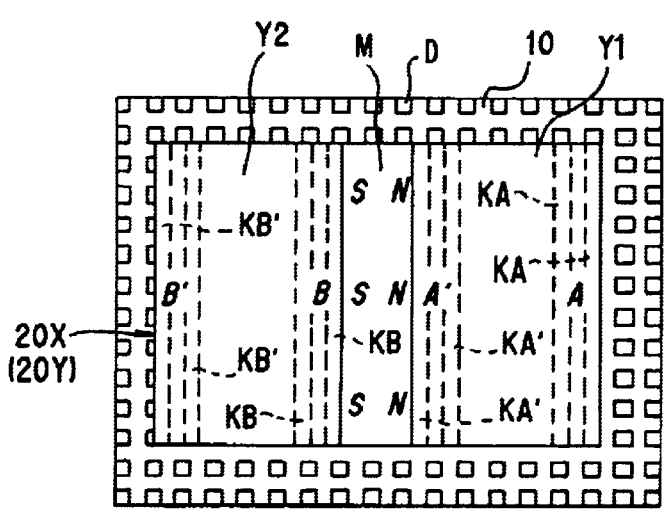
FIG. 32A is a plan view of a two-phase planar linear motor in FIG. 31.
Figure 32B:
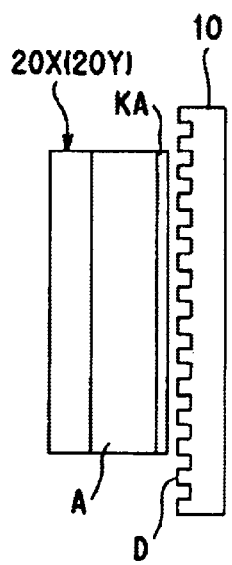
FIG. 32B is a right side view of the same two-phase planar linear motor.
Figure 32C:
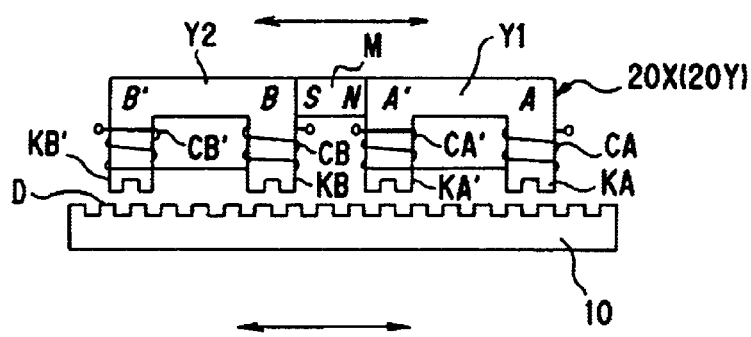
FIG. 32C is a front view of the same two-phase linear motor.

FIG. 29 is a perspective view of a binding structure according to an 11th embodiment. This binding means relates to an improvement of the embodiment of FIG. 28.

Dovetail section grooves 91a are formed in the back surface of the stacked member 91A. The long male members 120a are formed to have dovetail sections. The long male members 120 are inserted into the openings of the dovetail section grooves 91a to be fit into the dovetail section grooves 91a, then a fluid hardening material is injected into the clearances to form joints 100I of the fluid hardening material. Since a holding action is exhibited by the mechanical female and male mating parts, the connecting force is strong. Further, the long male members 120 function as jigs for aligning and stacking the magnetic sheets T, so can be used in the step of putting together the magnetic sheets, so the ease of handling of the stacked member is improved.

Note that the above embodiments were explained in detail as illustrations of the binding means, but needless to say it is possible to employ various modifications as to detailed parts in embodying the technical idea of the present invention.

INDUSTRIAL APPLICABILITY

The platen according to the present invention exhibits the following effects, so is useful as a stator of a planar linear motor:

(1) Since it is possible to suppress breakdown and deformation of the stacked member and one parallel sheet edge surface side of the stacked member is free, it is possible to ensure the flatness of the platen surface. Further, the area between the connecting beam members is a non-bound region, so it is possible to suppress to an extreme working deformation or strain etc. of the magnetic sheets accompanying the binding process from reaching the platen surface side. Therefore by reducing the thickness of the stacked member (width of the magnetic sheets), it is possible to realize a lower cost and lighter weight of the high performance stacked platen.

(2) If using a joint of a fluid hardening material as the binding means, initial stress does not easily occur at the time of the binding work, so it is possible to suppress the deformation of the stacked member from reaching the platen surface and possible to realize a thinner stacked member.

(3) If a female molded part or male molded part is used at the stacked member side, mating female and male parts can be automatically formed, so the anchor action is increased and the connection strength can be raised.

(4) If providing an outside frame abutting against the two side surfaces of the stacked member in at least the stacking direction and clamping the stacked member, it is possible to prevent torsion at the magnetic sheets even if an outside force or inertial force acts from the side on the stacked member during transport of the platen etc.

(5) If placing a backing plate against the other parallel sheet edge surface of the stacked member, it functions as a spacer for defining the distance between facing side plates of the outside frame. Further, the backing plate can provide support at the regions not facing the connecting beam members in the other parallel sheet edge surface, so it is possible to directly prevent deformation of the stacked member. Further, since the other parallel sheet edge surface is placed against the flat surface of the backing plate, by controlling the width dimensions of the magnetic sheets to a high precision, the flatness of the platen surface can be ensured.

(6) If using a stacked member having bonding layers interposed between adjoining magnetic sheets, it is possible to prevent deformation of the stacked member. When employing injection type joints of a molten metal material for a stacked member interposed with adhesive bonding layers, quick curing of the adhesive can be expected due to the surplus heat and the drying and aging step can be simplified.

(7) It is possible to obtain a finished product by precision punching of magnetic sheets having notches for forming joints of the fluid hardening material, projections, and projections for platen dots and possible to eliminate the step of forming the two-dimensional array of platen dots after the stacking step.

(8) When the binding means is a laser beam welded joint, since instantaneous welding limiting the welding zones is used, it is possible to prevent thermal strain of the stacked member. At that time, since it is possible to cool the platen surface side, it is possible to avoid thermal strain reaching the platen surface.

What is claimed is:

1. A platen for a planar linear motor provided with a platen body using a stacked member comprised of a large number of magnetic sheets aligned and stacked together and having a large number of platen dots formed in a two-dimensional array at one parallel sheet edge surface side of the stacked member, said platen for a planar linear motor having a connecting beam member supporting said stacked member at regular discrete positions in the sheet edge direction at the other parallel sheet edge surface side of the stacked member and binding means for binding the magnetic sheets between the other parallel sheet edge surface side and the connecting beam members.

2. A platen for a planar linear motor as set forth in claim 1, wherein each of said binding means is a joint of a fluid hardening material having a molded connecting part fastening to a male part or female part formed along a perpendicular direction of the other parallel sheet edge surface and a molded joining part connected with the molded connecting part and holding part of a connecting beam member.

3. A platen for a planar linear motor as set forth in claim 2, wherein said female part is a groove, said platen body has a backing plate placed against the other parallel sheet edge surface, the backing plate has a plurality of first through holes discretely arranged longitudinally in lines across the strip-shaped portion facing the grooves, each connecting beam member has a bent side end placed against the backing plate, said bent side end has a plurality of second through holes discretely arranged longitudinally in lines in the beam longitudinal direction, and said molded connecting part is a rivet-shaped molded part formed by filling the first and second through holes.

4. A platen for a planar linear motor as set forth in claim 3, wherein said groove is narrow in opening and broad in interior in lateral cross-section.

5. A platen for a planar linear motor as set forth in claim 1, wherein each of said binding means is a welded joint formed by laser beam welding abutting edges of a side surface of a connecting beam member and the other parallel sheet edge surface along the same.

6. A platen for a planar linear motor as set forth in claim 5, wherein each said connecting beam member has a bent side end, and said side surface is an outside surface of said bent side end.

7. A platen for a planar linear motor as set forth in claim 1, wherein each said connecting beam member is provided with a beam body having a bent side end and a long spacer placed against an outside surface of said bent side end and fastened or made integral with the same, and each of said binding means is a welded joint formed by laser beam welding abutting edges of the long spacer and the other parallel sheet edge surface along the same.

8. A platen for a planar linear motor as set forth in claim 1, wherein said stacked member has grooves formed along a perpendicular direction of the other parallel sheet edge surface, each said connecting beam member is provided with a beam body having a bent side end and a long male part placed against the outside surface of the bent side end and fastened or made integral with the same, and each of said binding means is a joint of a fluid hardening material formed by filling clearances between the long male part and the groove loosely fit together.

9. A platen for a planar linear motor as set forth in claim 8, wherein each said groove is narrow in opening and broad in interior in lateral cross-section, the long male part is broad in front end and narrow in base in lateral cross-section, and the front end of the long male part is inserted into the opening of the groove.

10. A platen for a planar linear motor as set forth in claim 2, wherein said female part is a groove, said connecting beam member has a bent side end, said bent side end has a plurality of through holes discretely arranged longitudinally in lines in the beam longitudinal direction, said molded connecting part is a male molded part formed by filling the groove, and the molded joining part is a rivet-shaped molded part formed by filling the through holes.

11. A platen for a planar linear motor as set forth in claim 10, wherein said groove is narrow in opening and broad in interior in lateral cross-section.

12. A platen for a planar linear motor as set forth in claim 2, wherein said male part is a projecting ridge, each said connecting beam member has a groove having a plurality of through holes discretely arranged in a line longitudinally along the beam longitudinal direction in the groove bottom, said molded connecting part is a female molded part formed by filling the remaining clearance in said groove when said groove accommodates said projecting ridge, and said molded joining part is a rivet-shaped molded part formed by filling said through holes.

13. A platen for a planar linear motor as set forth in claim 12, wherein said projecting ridge is broad in front end and narrow in base in lateral cross-section.

14. A platen for a planar linear motor as set forth in claim 12, wherein said female part is narrow in opening and broad in interior in lateral cross-section, each said connecting beam member has a plurality of notches formed discretely along the beam longitudinal direction of its side end surface, said molded connecting part is a male molded part formed by filling the remaining clearance when said side end surface is made to abut against the bottom surface of said groove, and said molded joining part is a rivet-shaped molded part formed by the overflow of the material from the opening of said groove.

15. A platen for a planar linear motor as set forth in claim 14, wherein female part is a first groove narrow in opening and broad in interior in lateral cross-section, each said connecting beam member has a bent side end, said bent side end has a second groove formed at its outside surface along the beam longitudinal direction and narrow in opening and broad in interior in lateral cross-section, and each of said binding means is a pegged dual bulging end molded part formed by filling the first and second grooves in a mated state.

16. A platen for a planar linear motor as set forth in any one of claims 10 to 15, wherein said stacked member is comprised with bonding layers interposed between adjoining magnetic sheets.

17. A platen for a planar linear motor as set forth in any one of claims 10 to 15, wherein said fluid hardening material is a molten metal material.

18. A platen for a planar linear motor as set forth in claim 17, wherein said molten metal material is a filler material.

19. A platen for a planar linear motor as set forth in claim 18, wherein said filler material is an aluminum alloy.

20. A platen for a planar linear motor as set forth in any one of claims 10 to 15, wherein said fluid hardening material is a molten resin material.

21. A platen for a planar linear motor as set forth in any one of claims 10 to 15, wherein said fluid hardening material is an adhesive.

22. A platen for a planar linear motor as set forth in any one of claims 1 to 15, wherein said magnetic sheets are blankings provided with platen dot use projections at every predetermined spatial period along one side edge.

23. A platen for a planar linear motor as set forth in any one of claims 1 to 15, wherein said platen dots are formed by shape-cutting electrodischarge machining the other parallel sheet edge surface of the stacked member.

24. A platen for a planar linear motor as set forth in any one of claims 1 to 15, wherein said platen dots are formed by etching one parallel sheet edge surface of the stacked member.

25. A platen for a planar linear motor as set forth in any one of claims 1 to 24, further provided with an outside frame abutting against at least the two side surfaces of the stacked member in the stacking direction and clamping the stacked member.

26. A platen for a planar linear motor as set forth in claim 25, characterized in that said platen body and said outside frame form a box structure.

* * * * *